(12) United States Patent
Mitchell et al.

(10) Patent No.: US 6,256,422 B1
(45) Date of Patent: Jul. 3, 2001

(54) TRANSFORM-DOMAIN CORRECTION OF REAL-DOMAIN ERRORS

(75) Inventors: Joan LaVerne Mitchell, Cortlandt Manor, NY (US); Martin James Bright, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/186,245

(22) Filed: Nov. 4, 1998

(51) Int. Cl.[7] ............................... G06K 9/36; G06K 9/46
(52) U.S. Cl. .................... 382/248; 382/251; 375/240.17; 375/240.18
(58) Field of Search .................................. 382/232, 233, 382/236, 248, 250, 251, 260, 276; 348/416.1, 419.1, 410.1, 409.1, 518; 375/518, 240.16, 240.17, 240.18, 240.19, 240.2, 240.27; 341/67, 71

(56) References Cited

U.S. PATENT DOCUMENTS

| | | | |
|---|---|---|---|
| 5,544,266 | * | 8/1996 | Koppelmans et al. .................. 341/76 |
| 5,590,139 | * | 12/1996 | Suzuki et al. ......................... 386/112 |
| 5,731,837 | * | 3/1998 | Hurst ................................. 348/419.1 |
| 5,764,298 | * | 6/1998 | Morrison .............................. 348/518 |
| 6,005,623 | * | 12/1999 | Takahashi et al. ................. 348/416.1 |

* cited by examiner

Primary Examiner—Amelia M. Au
Assistant Examiner—Jingge Wu
(74) Attorney, Agent, or Firm—Louis P. Herzberg

(57) ABSTRACT

This invention solves problems due to employing error degraded data in digital processing. It particularly solves the multi-generation problem wherein transform data degrade during each inverse transform and forward transform cycle even without any processing due to the rounding and clipping errors. It provides methods, systems and apparatus for transform-domain correction of real-domain errors in the processing of transform, transform-coded, and coded data. After inverse transformation of transform data the high-precision numbers are converted to integers and clipped to an allowed range forming converted data. High-precision differences are obtained by subtracting converted data from the high-precision output of the inverse transform. The differences are re-transformed back to the transform domain and saved. In an alternate embodiment the differences are quantized, thus, only significant errors are saved. In still another embodiment the quantized differences are entropy encoded. Then after re-transforming the processed converted data, the decoded differences, the dequantized differences, or the transformed differences can be used in the transform domain to remove the real-domain errors introduced by the original conversion to integers and clipping to the allowed range.

88 Claims, 22 Drawing Sheets

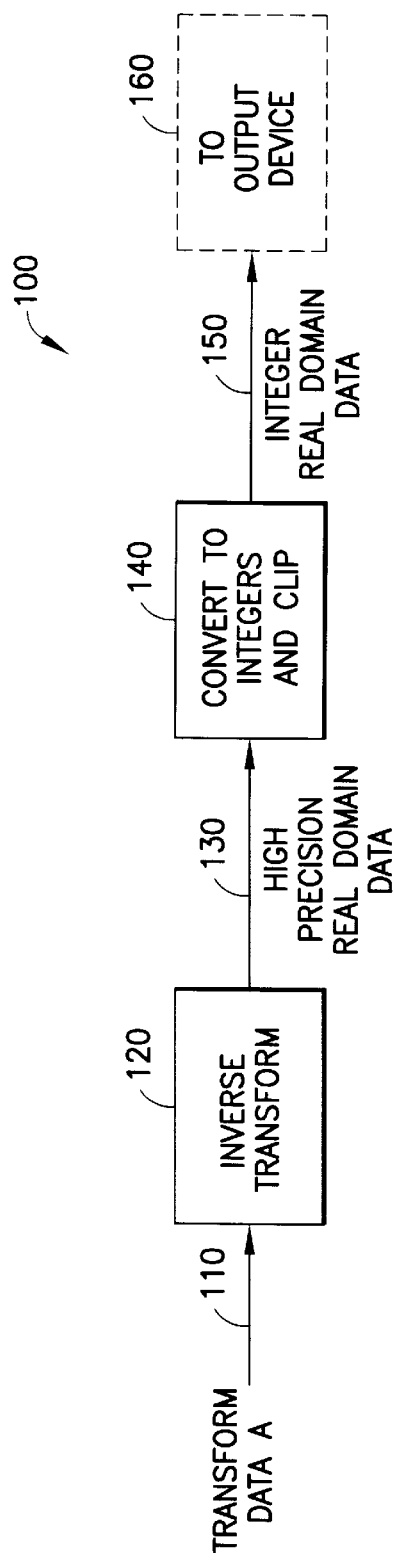
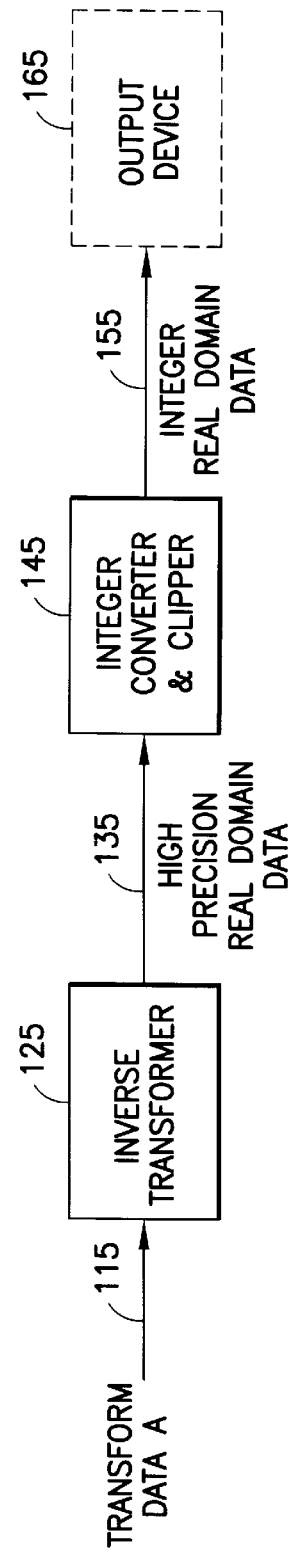

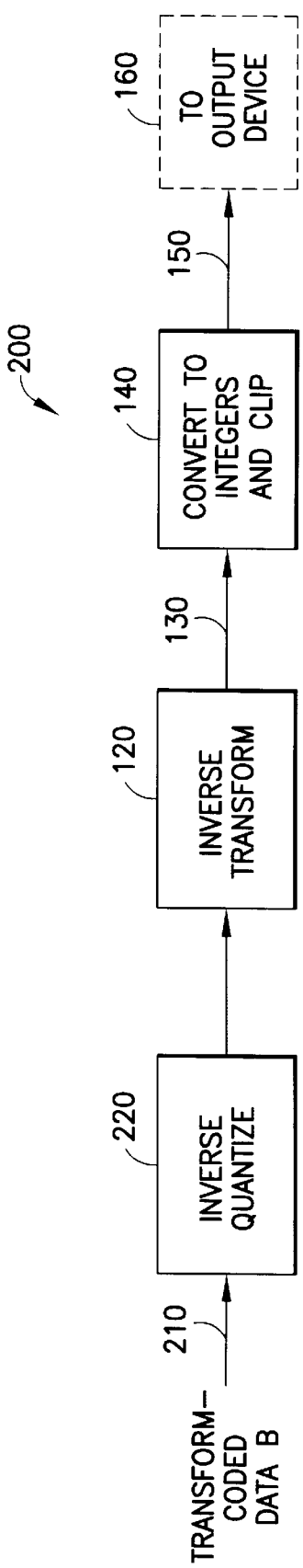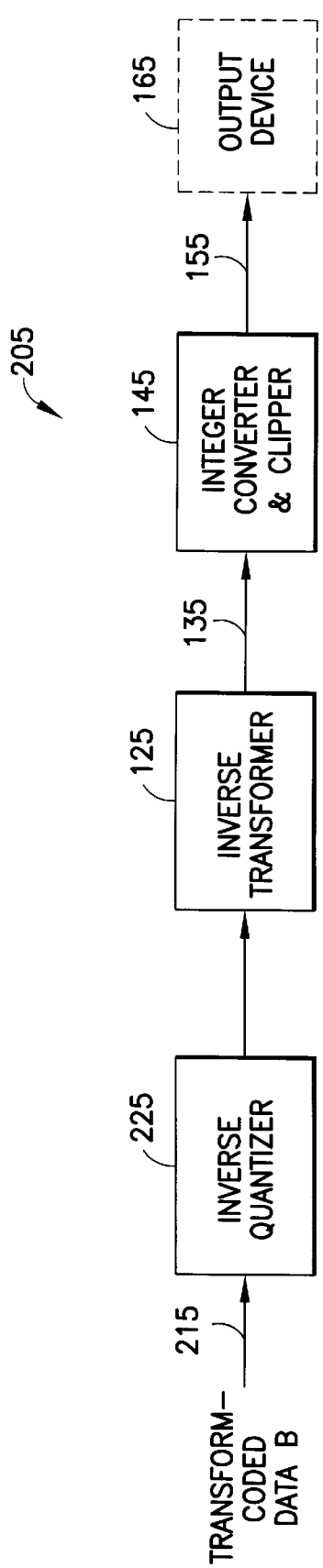

$$\begin{pmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 63 & 81 & 104 & 113 & 92 \\ 49 & 64 & 78 & 87 & 103 & 121 & 120 & 101 \\ 72 & 92 & 95 & 98 & 112 & 100 & 103 & 99 \end{pmatrix}$$

FIG.8(a)

$$\begin{pmatrix} 17 & 18 & 24 & 47 & 99 & 99 & 99 & 99 \\ 18 & 21 & 26 & 66 & 99 & 99 & 99 & 99 \\ 24 & 26 & 56 & 99 & 99 & 99 & 99 & 99 \\ 47 & 66 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \end{pmatrix}$$

FIG.8(b)

TRANSFORM-DOMAIN CORRECTION OF REAL-DOMAIN ERRORS

CROSS REFERENCES

The present application is related to the following applications even dated herewith: Attorney docket number YO998-331, entitled, "Reduced-error processing of transformed digital data," by inventors M. Bright et al., and Attorney docket number YO998-373, entitled, "Error reduction in transformed digital data," by inventors M. Bright et al., which are incorporated herein in entirety by reference.

FIELD OF THE INVENTION

This invention relates to transform coding of digital data, specifically to real domain processing of transform data. More particularly, this invention relates to reduced-error digital processing of inverse transformed data which is re-transformed.

BACKGROUND OF THE INVENTION

Transform coding is the name given to a wide family of techniques for data coding, in which each block of data to be coded is transformed by some mathematical function prior to further processing. A block of data may be a part of a data object being coded, or may be the entire object. The data generally represent some phenomenon, which may be for example a spectral or spectrum analysis, an image, an audio clip, a video clip, etc. The transform function is usually chosen to reflect some quality of the phenomenon being coded; for example, in coding of audio, still images and motion pictures, the Fourier transform or Discrete Cosine Transform (DCT) can be used to analyze the data into frequency terms or coefficients. Given the phenomenon being coded, there is generally a concentration of the information into a few frequency coefficients. Therefore, the transformed data can often be more economically encoded or compressed than the original data. This means that transform coding can be used to compress certain types of data to minimize storage space or transmission time over a communication link.

An example of transform coding in use is found in the Joint Photographic Experts Group (JPEG) international standard for still image compression, as defined by ITU-T Rec. T.81 (1992) | ISO/IEC 10918-1:1994, Information technology—Digital compression and coding of continuous-tone still images, Part 1: Requirements and Guidelines. Another example is the Moving Pictures Experts Group (MPEG) international standard for motion picture compression, defined by ISO/IEC 11172:1993, Information Technology—Coding of moving pictures and associated audio for digital storage media at up to about 1,5 Mbits/s. This MPEG-1 standard defines systems for both video compression (Part 2 of the standard) and audio compression (Part 3). A more recent MPEG video standard (MPEG-2) is defined by ITU-T Rec. H. 262 | ISO/IEC 13818-2: 1996 Information Technology—Generic Coding of moving pictures and associated audio—Part 2: video. A newer audio standard is ISO/IEC 13818-3: 1996 Information Technology—Generic Coding of moving pictures and associated audio—Part 3: audio. All three image international data compression standards use the DCT on 8×8 blocks of samples to achieve image compression. DCT compression of images is used herein to give illustrations of the general concepts put forward below; a complete explanation can be found in Chapter 4 "The Discrete Cosine Transform (DCT)" in W. B. Pennebaker and J. L. Mitchell, JPEG: *Still Image Data Compression Standard*, Van Nostrand Reinhold: New York, (1993).

Wavelet coding is another form of transform coding. Special localized basis functions allow wavelet coding to preserve edges and small details. The transformed data is usually quantized for compression purposes. Wavelet coding is used for fingerprint identification by the FBI. Wavelet coding is a subset of the more general subband coding technique. Subband coding uses filter banks to decompose the data into particular bands. Compression is achieved by quantizing the lower frequency bands more finely than the higher frequency bands while sampling the lower frequency bands more coarsely than the higher frequency bands. A summary of wavelet, DCT, and other transform coding is given in Chapter 5 "Compression Algorithms for Diffuse Data" in Roy Hoffman, *Data Compression in Digital Systems*, Chapman and Hall: New York, (1997).

In any technology and for any phenomenon represented by digital data, the data before a transformation is performed are referred to as being "in the real domain". After a transformation is performed, the new data are often called "transform data" or "transform coefficients", and referred to as being "in the transform domain". The function used to take data from the real domain to the transform domain is called the "forward transform". The mathematical inverse of the forward transform, which takes data from the transform domain to the real domain, is called the respective "inverse transform".

In general, the forward transform will produce real-valued data, not necessarily integers. To achieve data compression, the transform coefficients are converted to integers by the process of quantization. Suppose that $(\lambda_i)$ is a set of real-valued transform coefficients resulting from the forward transform of one unit of data. Note that one unit of data may be a one-dimensional or two-dimensional block of data samples or even the entire data. The "quantization values" $(q_i)$ are parameters to the encoding process. The "quantized transform coefficients" or "transform-coded data" are the sequence of values $(a_i)$ defined by the quantization function Q:

$$a_i = Q(\lambda_i) = \left\lfloor \frac{\lambda_i}{q_i} + 0.5 \right\rfloor \tag{1}$$

where $\lfloor x \rfloor$ means the greatest integer less than or equal to x.

The resulting integers are then passed on for possible further encoding or compression before being stored or transmitted. To decode the data, the quantized coefficients are multiplied by the quantization values to give new "dequantized coefficients" $(\lambda_i')$ given by $$\lambda_i' = q_i a_i. \tag{2}$$

The process of quantization followed by dequantization (also called inverse quantization) can thus be described as "rounding to the nearest multiple of $q_i$". The quantization values are chosen so that the loss of information in the quantization step is within some specified bound. For example, for audio or image data, one quantization level is usually the smallest change in data that can be perceived. It is quantization that allows transform coding to achieve good data compression ratios. A good choice of transform allows quantization values to be chosen which will significantly cut down the amount of data to be encoded. For example, the DCT is chosen for image compression because the frequency components which result produce almost independent responses from the human visual system. This means that the coefficients relating to those components to which the visual system is less sensitive, namely the high-frequency components, may be quantized using large quantization values without perceptible loss of image quality. Coefficients relating to components to which the visual system is more sensitive, namely the low-frequency components, are quantized using smaller quantization values.

The inverse transform also generally produces non-integer data. Usually the decoded data are required to be in integer form. For example, systems for the playback of audio data or the display of image data generally accept input in the form of integers. For this reason, a transform decoder generally includes a step that converts the non-integer data from the inverse transform to integer data, either by truncation or by rounding to the nearest integer. There is also often a limit on the range of the integer data output from the decoding process in order that the data may be stored in a given number of bits. For this reason the decoder also often includes a "clipping" stage that ensures that the output data are in an acceptable range. If the acceptable range is [a,b], then all values less than a are changed to a, and all values greater than b are changed to b.

These rounding and clipping processes are often considered an integral part of the decoder, and it is these which are the cause of inaccuracies in decoded data and in particular when decoded data are re-encoded For example, the JPEG standard (Part 1) specifies that a source image sample is defined as an integer with precision P bits, with any value in the range 0 to $2^{**}P-1$. The decoder is expected to reconstruct the output from the inverse discrete cosine transform (IDCT) to the specified precision. For the baseline JPEG coding P is defined to be 8; for other DCT-based coding P can be 8 or 12. The MPEG-2 video standard states in Annex A (Discrete cosine transform) "The input to the forward transform and the output from the inverse transform is represented with 9 bits."

For JPEG the compliance test data for the encoder source image test data and the decoder reference test data are 8 bit/sample integers. Even though rounding to integers is typical, some programming languages convert from floating point to integers by truncation. Implementations in software that accept this conversion to integers by truncation introduce larger errors into the real-domain integer output from the inverse transform.

The term "high-precision" is used herein to refer to numerical values which are stored to a precision more accurate than the precision used when storing the values as integers. Examples of high-precision values are floating-point or fixed-point representations of numbers.

SUMMARY OF THE INVENTION

In light of the problems described above regarding inaccuracies caused by digital processing techniques and by such things as rounding and clipping after the inverse transform of transform data, one aspect of this invention provides a method for processing transform data in the real domain, forward transforming the processed data, and then correcting the inaccuracies in the transform domain. This method reduces the undesired errors in the re-transformed data produced by such things as rounding to integers and clipping to an allowed range after the inverse transform. In an embodiment, this method includes: performing the inverse transform of the transform data such that the real-domain data produced are in the form of high-precision numbers; converting the high-precision numbers to integers and clipping to an allowed range forming converted data; subtracting the converted data from the high-precision numbers forming high-precision differences; processing the converted data; forward transforming the high-precision differences; forward transforming the processed converted data; and adding the transformed processed data to the transformed high-precision differences to create transform-domain corrected real-domain re-transformed digital data.

It is another aspect of this invention to provide a method for processing transform data in the real domain, processing the errors produced from the conversion to integers and clipping to the allowed range, forward transforming the errors, forward transforming the processed data, and then correcting the errors in the transform domain. In an embodiment, the method for transform-domain correction of such real-domain errors includes: performing the inverse transform of the transform data such that the real-domain data produced are in the form of high-precision numbers; converting the high-precision numbers to integers and clipping to an allowed range forming converted data; subtracting the converted data from the high-precision numbers forming high-precision differences; manipulating the high-precision differences forming processed high-precision differences; manipulating the converted data forming processed converted data; forward transforming the processed high-precision differences; forward transforming the processed converted data; and adding the transformed processed converted data to the transformed processed high-precision differences to create transform-domain corrected real-domain processed transformed digital data.

It is another aspect of this invention to provide a method for processing transform data in the real domain, forward transforming the errors produced from the conversion to integers and clipping to the allowed range in the real domain, processing the transformed errors in the transform domain, forward transforming the processed converted data, and then correcting the errors in the transform domain. In an embodiment, the method includes: performing the inverse transform of the transform data such that the real-domain data produced are in the form of high-precision numbers; converting the high-precision numbers to integers and clipping to an allowed range forming converted data; subtracting the converted data from the high-precision numbers forming high-precision differences; forward transforming the high-precision differences; manipulating the transformed differences; manipulating the converted data; forward transforming the manipulated converted data; and adding the transformed manipulated converted data to the manipulated transformed differences to create new transform-domain corrected real-domain processed transformed digital data.

Still another aspect of the present invention is to provide a method for processing transform-coded data in the real domain to produce new transform-coded data, which reduces the error produced by converting to integers and clipping to an allowed range after the inverse transform. In an embodiment, this method includes: performing the inverse quantization of the transform-coded data; performing the inverse transform of the transform data thus produced, such that the real-domain data produced are in the form of high-precision numbers; converting the high-precision numbers to integers and clipping to an allowed range forming converted data; subtracting the converted data from the high-precision numbers forming high-precision differences; forward transforming the high-precision differences; quantizing the transformed data thus produced forming transform-coded error data; inverse quantizing the transform-coded error data producing dequantized transformed error data; processing the converted data in the real domain; forward transforming the processed converted data; adding the dequantized transformed error data to the transformed processed converted data; and implementing quantization on the new transform data. If the errors in the forward and inverse transforms and in the processing are sufficiently small, there will be no undesirable errors produced in the new quantized transform-domain data.

Still another aspect of the present invention is to provide a method for processing the initial high-precision errors in the real domain to produce new high-precision errors, which reduces the error produced by converting to integers and clipping to an allowed range after the inverse transform. In an embodiment, this method includes: performing the inverse quantization of the transform-coded data; performing the inverse transform of the transform data thus produced, such that the real-domain data produced are in the form of high-precision numbers; converting the high-precision numbers to integers and clipping to an allowed range forming converted data; subtracting the converted data from the high-precision numbers forming high-precision differences; manipulating these high-precision differences; forward transforming these manipulated high-precision differences; quantizing the transformed data thus produced forming transform-coded manipulated error data; inverse quantizing the transform-coded manipulated error data producing dequantized transformed manipulated error data; processing the converted data in the real domain; forward transforming the processed converted data; adding the dequantized transformed manipulated error data to the transformed processed converted data; and performing quantization on the new transform data.

It is another aspect of this invention to provide a method for processing coded data in the real domain which reduces the undesired errors in the data produced by the converting to integers and clipping to an allowed range after the inverse transform. In an embodiment, the method includes: entropy decoding the coded data forming transform-coded data, performing the inverse quantization of the transform-coded data; performing the inverse transform of the transform data thus produced, such that the real-domain data produced are in the form of high-precision numbers; converting the high-precision numbers to integers and clipping to an allowed range forming converted data; subtracting the converted data from the high-precision numbers forming high-precision differences; forward transforming these high-precision differences; quantizing the transformed data thus produced forming transform-coded error data; entropy encoding the transform-coded error data forming coded error data; entropy decoding the coded error data; inverse quantizing the transform-coded error data producing dequantized transformed error data; processing the converted data in the real domain; forward transforming the processed converted data; adding the dequantized transformed error data to the transformed processed converted data; performing quantization on the new transform data; and entropy encoding the new quantized data. If the errors in the forward and inverse transforms and in the processing are sufficiently small, there will be no undesirable errors produced in the new quantized transform-domain data.

Still another aspect of the present invention is to provide a method for processing coded data in the real domain to produce new coded data, which reduces the error produced by converting to integers and clipping to an allowed range after the inverse transform. In an embodiment, this method includes: entropy decoding the coded data forming transform-coded data, performing the inverse quantization of the transform-coded data; performing the inverse transform of the transform data thus produced, such that the real-domain data produced are in the form of high-precision numbers; converting the high-precision numbers to integers and clipping to an allowed range forming converted data; subtracting the converted data from the high-precision numbers forming high-precision differences; forward transforming these high-precision differences; quantizing the transformed data thus produced forming integer transform error data; entropy encoding the integer transform error data forming coded error data; entropy decoding the coded error data; inverse quantizing the integer transform error data producing dequantized transformed error data; manipulating the dequantized transformed error data; processing the converted data in the real domain; forward transforming the processed converted data; adding the manipulated dequantized transformed error data to the transformed processed converted data; and performing quantization on the new transform data. If the errors in the forward and inverse transforms and in the processing are sufficiently small, there will be no undesirable errors produced in the new quantized transform-domain data.

There is no requirement that the input data to the methods described herein need come from a single data source. Thus, this invention is not restricted to the real-domain processing of data from a single source, but also applies to real-domain processing of data from multiple sources, such as the merging of images or audio data.

The quantization described in the background is the linear quantization used in international image data compression standards such as JPEG and MPEG. There is no requirement that the quantization be linear. Any mapping that reduces the number of transform data levels in a deterministic way can be used with this invention. The quantization step has been described mathematically with a division in Equation (1). Actual embodiments may use a lookup table or a sequence of comparisons to achieve similar results.

It is a further aspect of the invention to provide apparatus, a computer product and an article of manufacture comprising a computer usable medium having computer readable program code means embodied therein for causing a computer to perform the methods of the present invention.

BRIEF DESCRIPTION OF FIGURES

These and other objects, features, and advantages of the present invention will become apparent upon further consideration of the following detailed description of the invention when read in conjunction with the drawing figures, in which:

FIG. 1(a) is a block diagram showing a method for performing an inverse transform;

FIG. 1(b) is a block diagram showing a system for performing an inverse transform;

FIG. 2(a) is a block diagram showing a method for decoding transform-coded data;

FIG. 2(b) is a block diagram showing a system for decoding transform-coded data;

FIG. 8(a) gives the JPEG example luminance quantization matrix;

FIG. 8(b) gives the JPEG example chrominance quantization matrix;

DESCRIPTION OF THE PROBLEM

Figure 3:
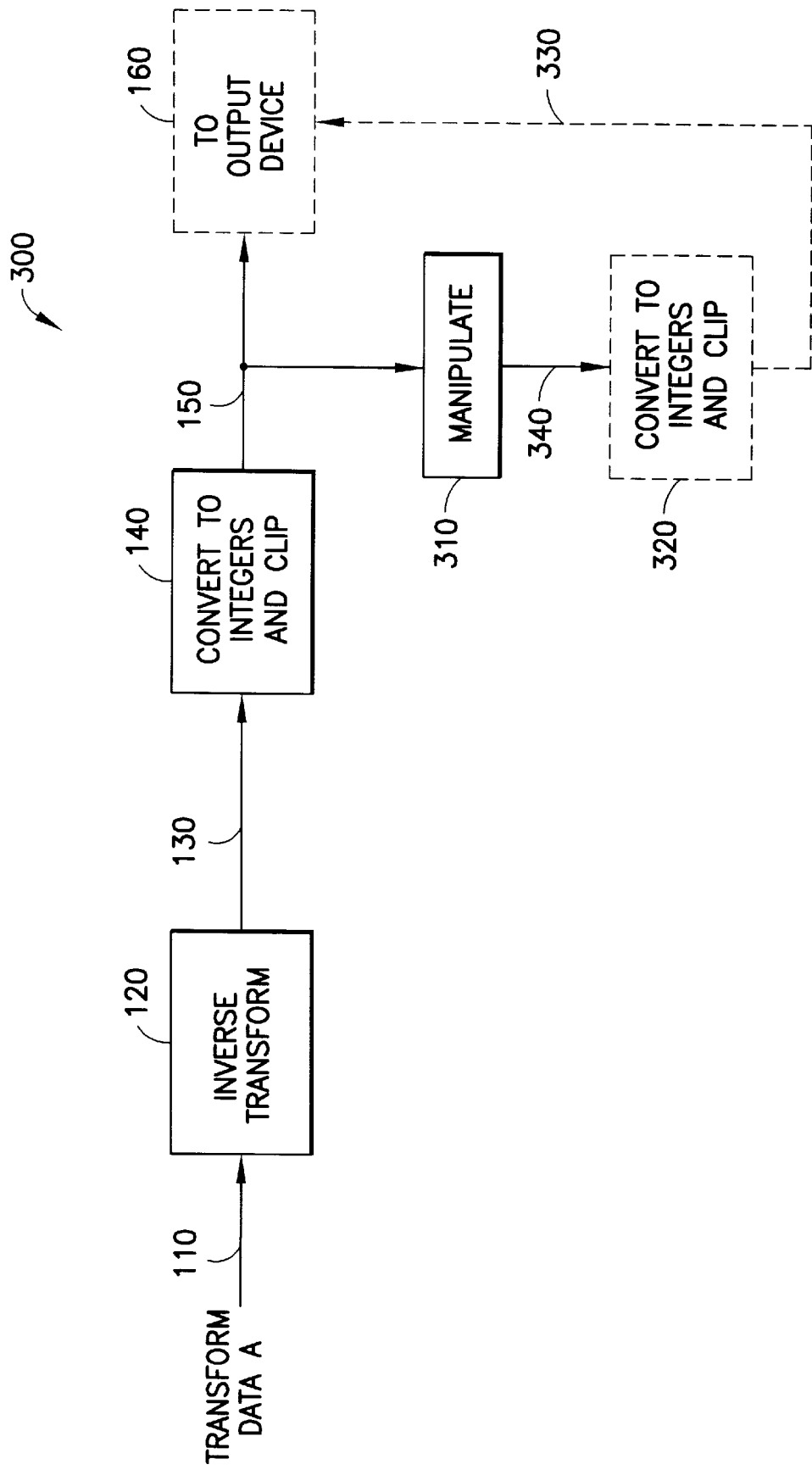
FIG. 3 is a block diagram showing a method for the real-domain processing of transform data.

This invention provides methods, systems, and computer products which reduce or eliminate errors introduced by the processing of digital data. Firstly, the source of the error is analyzed and described. This is followed by a presentation of the invention concepts for error reduction and elimination. It is particularly noted that data manipulation and/or processing as employed here-to-before used digital techniques contaminated by the continued introducing of errors by the respective implementation of digital processing. These techniques employed for years are responsible for an inability to maintain original data precision and the continued deterioration of the data representing the phenomenon as more processing is performed. This is particularly detrimental when a process is performed on data which contain errors imparted on the data by previous processes. This results in the continued impairment of the data which thereby becomes less and less useful as more and more processes are performed thereupon.

The seriousness of the problem as realized by the inventors of the present invention is described forthwith. It is noted that in the figures presented herein, optional steps are often shown with dashed lines and/or boxes.

It is noted that the concepts of the present invention are useful in almost any digital processing technology. However, the subsequent description is mostly related to image data. This is because of the general availability and continued usage of image data compression standards which are employed worldwide. These standards require the introduction into the digital data of the errors to be described and the continued employment and processing of the error contaminated data. These standards basically teach away from the present invention. Thus image technology is a good example for describing the present invention.

FIG. 1(a) shows an inverse transform method 100. Transform-domain data 'A' 110 are acted on by the inverse transform 120, which produces high-precision real-valued data 130. The high-precision data 130 are converted to integers and clipped 140 to produce integer real-domain data 150. In some cases, the integer-valued data are optionally sent to an output device 160.

FIG. 1(b) shows an inverse transform system 105. Transform-domain data 'A' 115 are acted on by the inverse transformer 125, which produces high-precision real-valued data 135. The high-precision data 135 are input to the integer converter and clipper 145 to produce integer real-domain data 155. In some cases, the integer-valued data are optionally input to an output device 165 such as a display monitor, a television set, or an audio player.

FIG. 2(a) shows a method 200 for decoding transform-coded (i.e. quantized) data. The integer transform-coded data 'B' 210 are inverse quantized 220 with quantization values as in Equation (2) above. The result of the dequantizing step may then be passed as input to the inverse transform 120, and decoding proceeds as in FIG. 1(a).

FIG. 2(b) shows a system 205 for decoding transform-coded (i.e. quantized) data. The integer transform-coded data 'B' 215 are input to the inverse quantizer 225 with quantization values as in Equation (2) above. The result of the dequantizing step is passed as input to the inverse transformer 125, and decoding proceeds as in FIG. 1(b).

One aspect of the present invention is concerned with the manipulation of both transform data and transform-coded data. The words "manipulation" and "processing" are used interchangeably herein. Manipulation may be employed in order to achieve many different results. For example, image data must often be processed before printing by scaling and/or rotation. Data from two sources can be merged as is performed in chroma-keying of images or mixing of audio data. Manual manipulation of data is often needed for editing or color correction. Such manipulation of transform data are often performed on the integer real-domain data which results from the transform decoding of FIG. 1(a) and/or FIG. 2(a).

A process for manipulation of transform data 300 is shown in FIG. 3. Integer data 150 undergo some form of manipulation 310. If this manipulation 310 does not produce integer output, the manipulated output 340 is again converted to integers and clipped 320. The resulting integer data 330 may be stored, transmitted, and/or optionally sent to an output device 160. Because the stage of clipping and converting to integers 140 is performed before the manipulation which accepts integer input 150, the resulting errors cause the data output from the manipulation 340 to contain at least small inaccuracies.

It is noted that there is no requirement in the data manipulation processes described above, for the input data to come entirely from one source. For example, many types of data manipulation involve the merging of data from two or more sources. This includes manipulations such as mixing of audio data or merging of images. The processes illustrated in the figures and described generally apply equally well to such types of manipulation. Thus the "input data" used for any of the processes described may in practice come from more than one input source.

Figure 4:
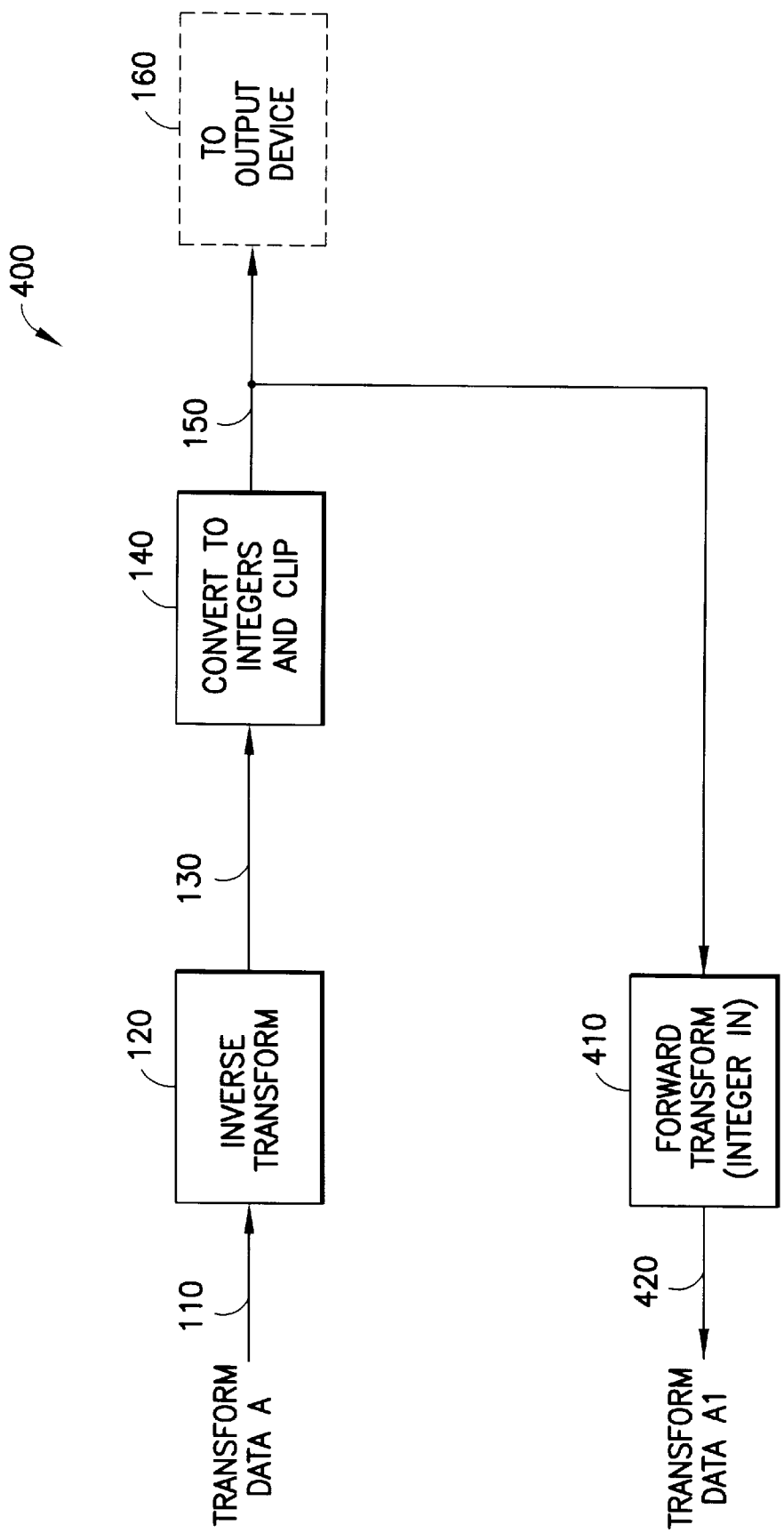
FIG. 4 is a block diagram showing a method for performing an inverse transform followed by a forward transform, and demonstrating the multi-generation problem.

It is often the case that data after manipulation are to be re-encoded to the transform domain. It is desirable that the process of decoding and re-encoding, when no manipulation is performed on the real-domain data, should be lossless. That is, the data, when the forward transform operation uses the same transform type operation as the inverse transform type of transform operation, should result in exactly the same transform-domain data as was present initially. However, errors are introduced by the converting to integers and clipping to the allowed range as is illustrated in FIG. 4. FIG. 4 shows the integer data 150 used as input to the forward transform device 410, which accepts integer-valued data as input. The resulting transform data 'A1' 420 are different from the original transform data 'A' 110 which were the input to the inverse transform. This is because the conversion to integers and the clipping process 140 have introduced errors into the process. The problem caused by the changes in data after each iteration, or "generation", of this process is herein called the "multi-generation problem".

Figure 5:
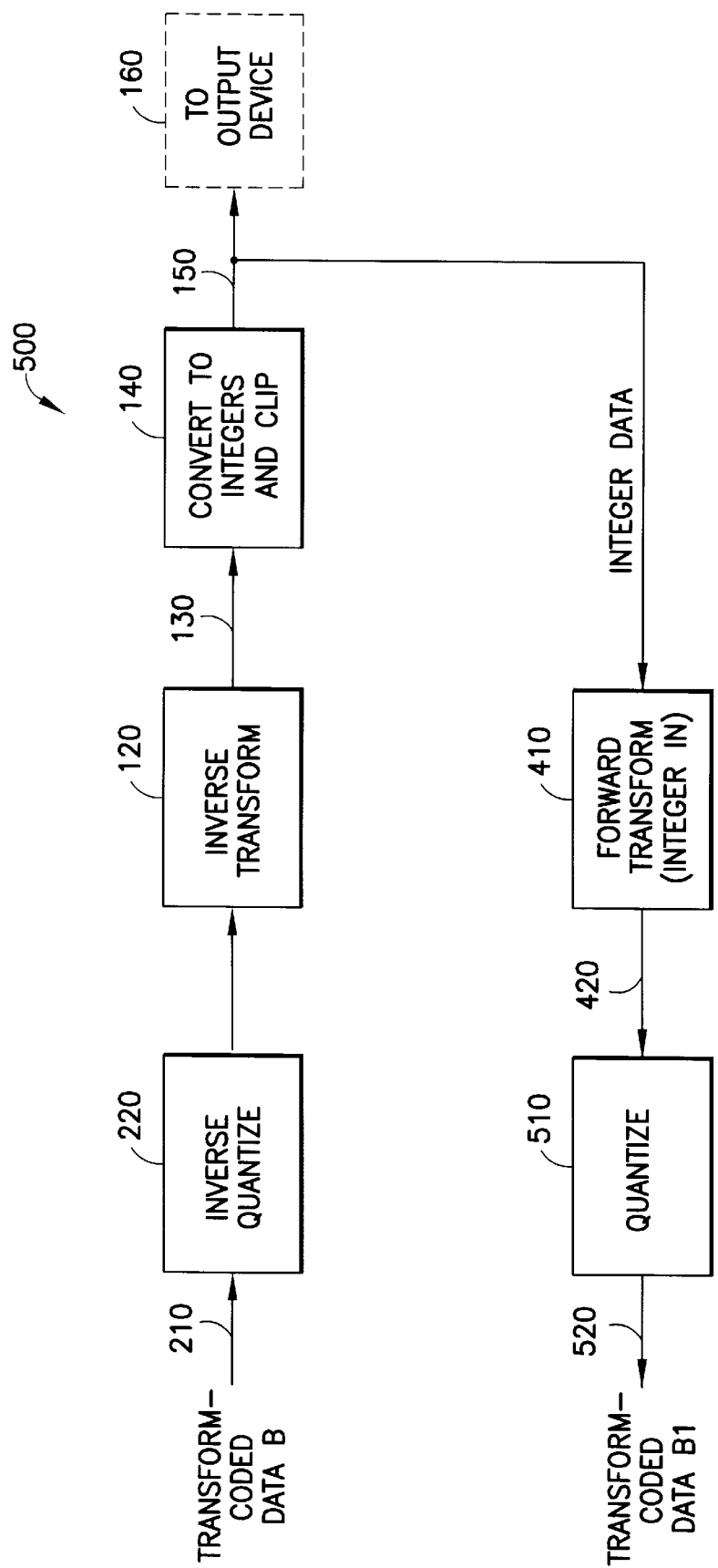
FIG. 5 is a block diagram showing a method for decoding and re-encoding transform-coded data, and demonstrating the multi-generation problem.

The multi-generation problem is also illustrated for transform-coded data in FIG. 5. Here the new transform-domain data 420 are quantized 510 to produce new transform-coded data 'B1' 520. It is important to realize that the quantized data can only change if the errors produced are larger than half a quantization step:

$$Q(\lambda_i + \epsilon) = Q(\lambda_i) \text{ if } |\epsilon| < 0.5 q_i \qquad (3)$$

where $\epsilon$ is the error produced in this transform coefficient. This is because each of the $\lambda_i$ is already a multiple of the quantization value, since they have been produced by dequantization as in Equation (2). Thus it is advantageous to control the errors so that they are sufficiently small. When the errors are sufficiently small, the new transform-coded data will be exactly the same as the original transform-coded data. The maximum possible error introduced by the conversion to integers by rounding is half the error introduced by truncating during the conversion.

Figure 6:
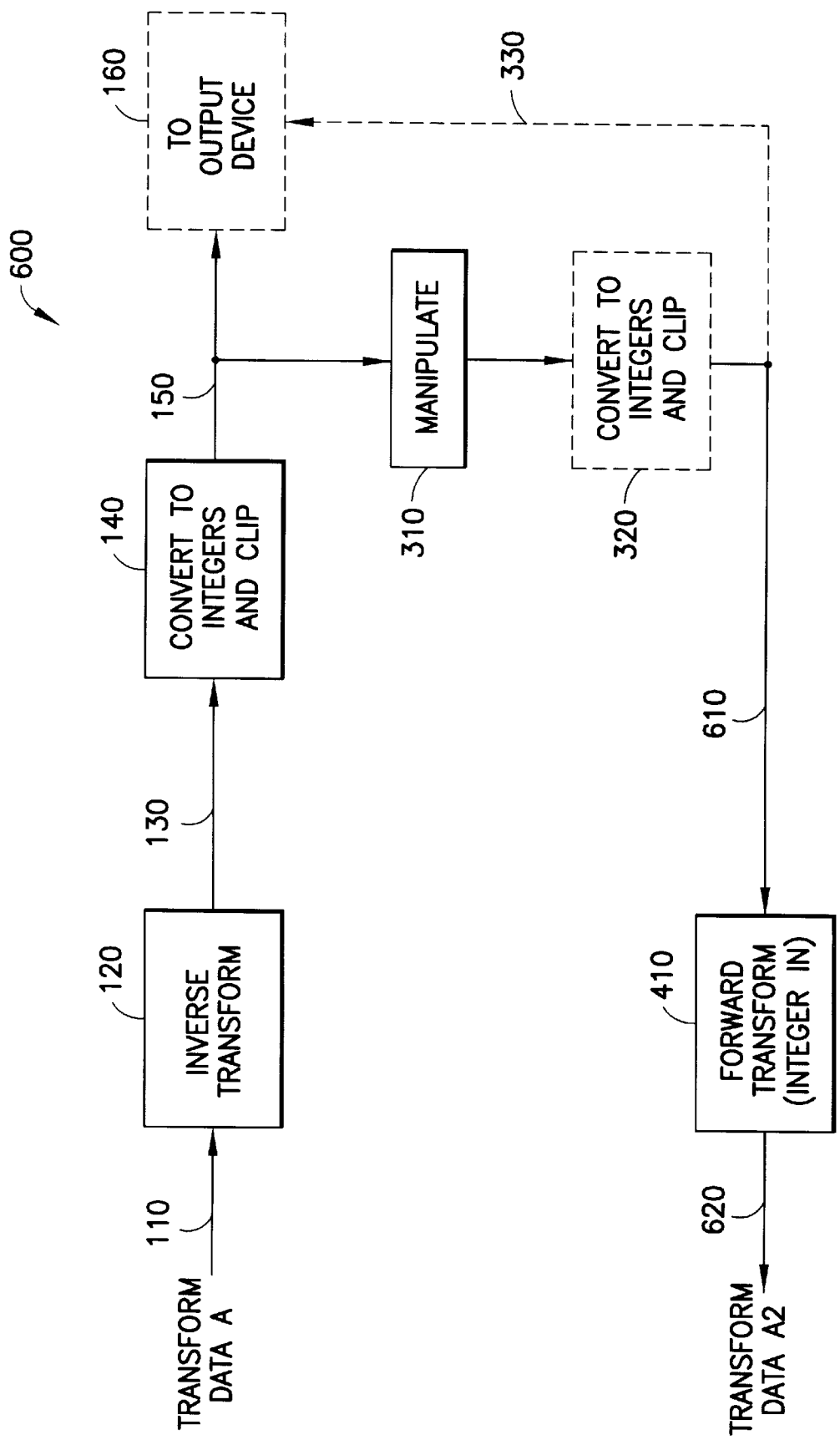
FIG. 6 is a block diagram showing a method for performing an inverse transform, real-domain data manipulation and a forward transform, and demonstrating the multi-generation problem.

FIG. 6 shows a case wherein image manipulation is performed on the data and the resulting modified data are then re-transformed back to the transform domain. The integer data 150 are manipulated as was shown in FIG. 3 to produce new integer-valued data 610. These new integer-valued data 610 are used as the input to the forward transform 410 to produce new transform data 'A2' 620. The fact that the process described above without any manipulation produces changes in the transform data 110 shows that when manipulation is performed there are undesired changes in the transform data 110 in addition to those which result from the desired manipulation.

Figure 7A:
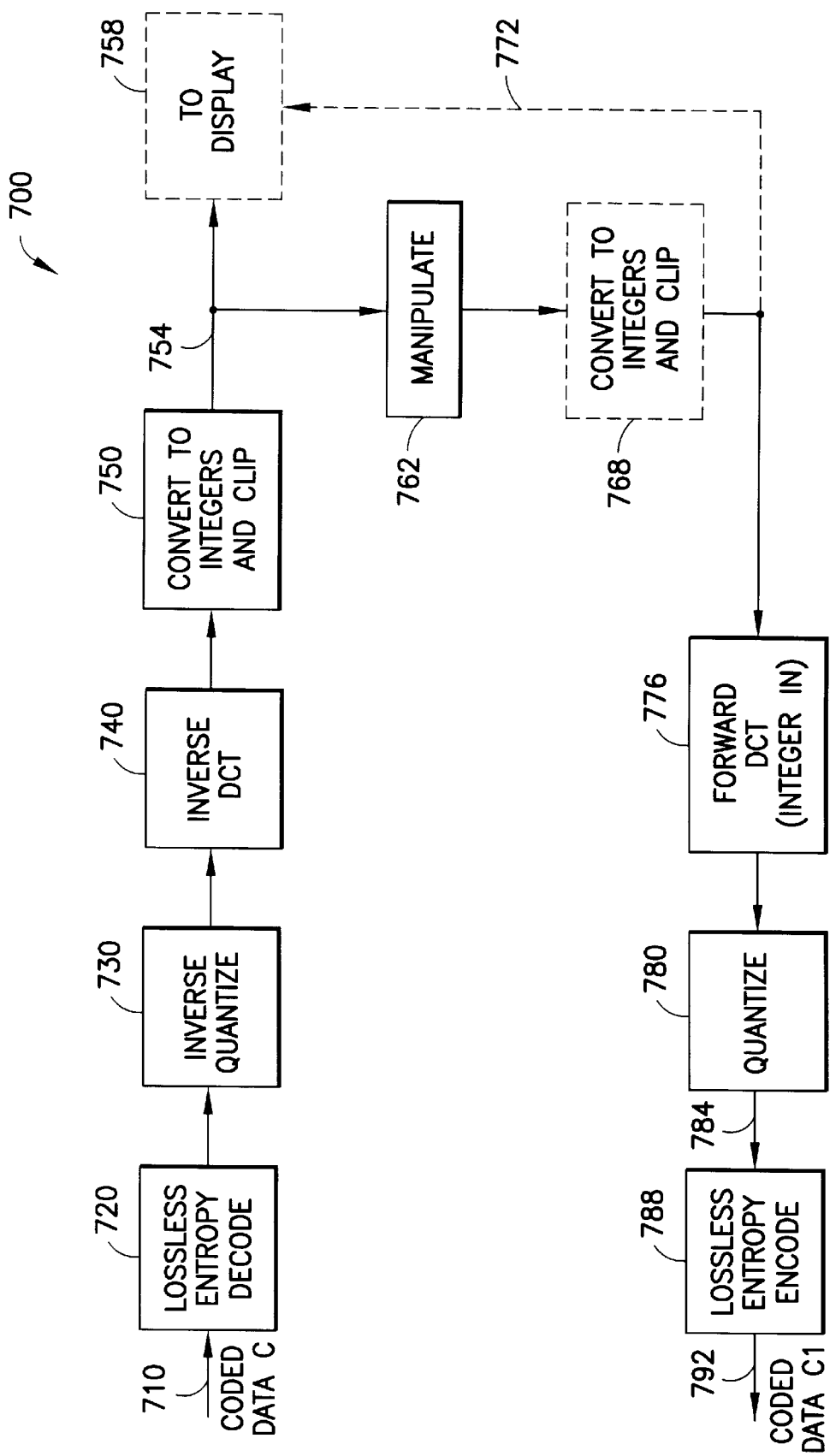
FIG. 7(a) is a block diagram showing a method for performing real-domain processing of JPEG DCT-coded image data, which exhibits the multi-generation problem.

An example of a method which embodies the process shown in FIG. 6, is shown in FIG. 7(a). The method 700 illustrated performs real-domain manipulation on coded data such as JPEG-coded image data. The coded data 'C' 710 are entropy decoded 720, which is defined for JPEG-coded data in the JPEG standard. The entropy decode step 720 decompresses the data into quantized DCT coefficients. These quantized coefficients are inverse quantized 730 and passed to the inverse transform, which in this system is the two-dimensional 8×8 inverse DCT 740. The resulting real-valued image data are rounded to integers and clipped 750 to the allowed range (e.g.[0,255]) to produce integer-valued image data 754 in the allowed range.

If it is necessary to show the data before manipulation, for example when the image manipulation is an interactive process, the image can optionally be sent to a display device 758. The image is then manipulated 762 to produce some desired change. If the result of the manipulation is non-integer data then the image data may be converted to integers and clipped to the range e.g. [0,255] 768. In this way the image data 772 may again be displayed 758. The new real-domain image data 772 are passed to the forward DCT 776 and the resulting DCT coefficients are quantized 780 to produce new quantized DCT coefficients 784. These coefficients 784 are then entropy encoded 788 to produce new coded data 'C1' 792 which are different from the original coded data 'C' 710. Now the new coded data 'C1' 792 incorporates not only the desired changes made to the image by the image manipulation 762, but also the errors resulting from the converting and clipping stages 750 and 768. It would be advantageous to eliminate or reduce these errors.

Figure 7B:
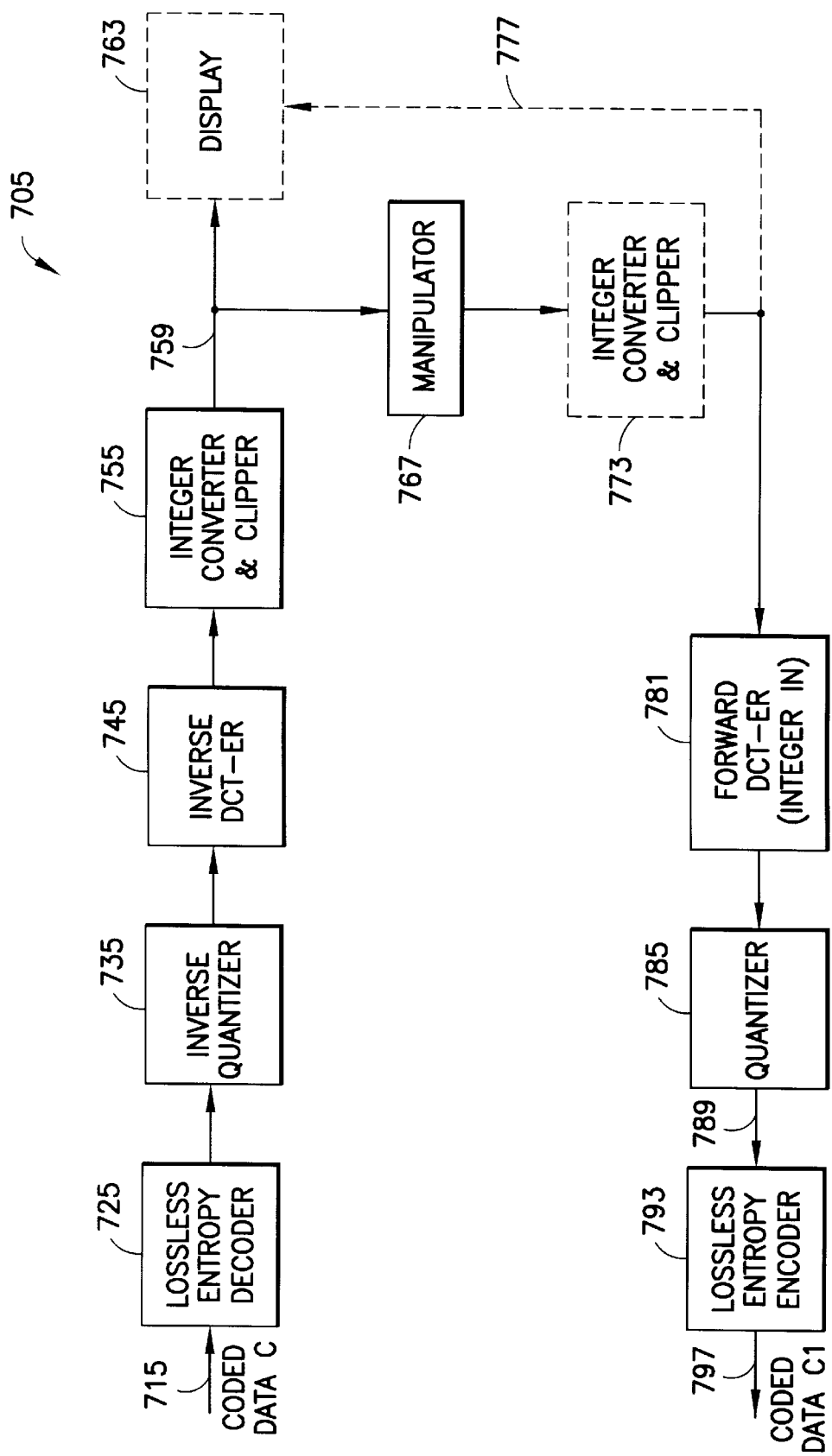
FIG. 7(b) is a block diagram showing a system for performing real-domain processing of JPEG DCT-coded image data, which exhibits the multi-generation problem.

An example of a system which embodies the process shown in FIG. 6, is shown in FIG. 7(b). The system 705 performs real-domain manipulation on coded data. The coded data 'C' 715 are input to the entropy decoder 725, which is defined for JPEG-coded data in the JPEG standard. The entropy decoder 725 decompresses the data into quantized DCT coefficients. These quantized coefficients are input to the inverse quantizer 735 and the output passed to the inverse transformer, which in this system is the two-dimensional 8×8 inverse DCT-er 745. The resulting real-valued image data are rounded to integers and clipped 755 (e.g. to the range [0,255]) to produce integer-valued image data 759 in the allowed range.

If it is necessary to show the data before manipulation, for example when the image manipulation is an interactive process, the image can optionally be sent to a display 763. The image is operated on by a manipulator 767 to produce some desired change. If the result of the manipulation is non-integer data then the image data may be passed to another integer converter and clipper 773. In this way the image data 777 may again be displayed 763. The new real-domain image data 777 are passed to the forward DCT-er 781 and the resulting DCT coefficients are input to the quantizer 785 to produce new quantized DCT coefficients 789. These coefficients 789 are then input to the entropy encoder 793 to produce new coded data 'C1' 797 which are different from the original coded data 'C' 715. Now the new coded data 'C1' 797 incorporates not only the desired changes made to the image by the image manipulator 767, but also the errors resulting from the integer converter and clippers 755 and 773.

FIG. 8(a) shows the JPEG example luminance quantization matrix 804 for 8×8 DCT luminance blocks. FIG. 8(b) gives the JPEG example chrominance quantization matrix 814 for 8×8 DCT chrominance blocks. The smallest quantization value in FIG. 8(a) is 10. The smallest quantization value in FIG. 8(b) is 17.

Figure 8C:
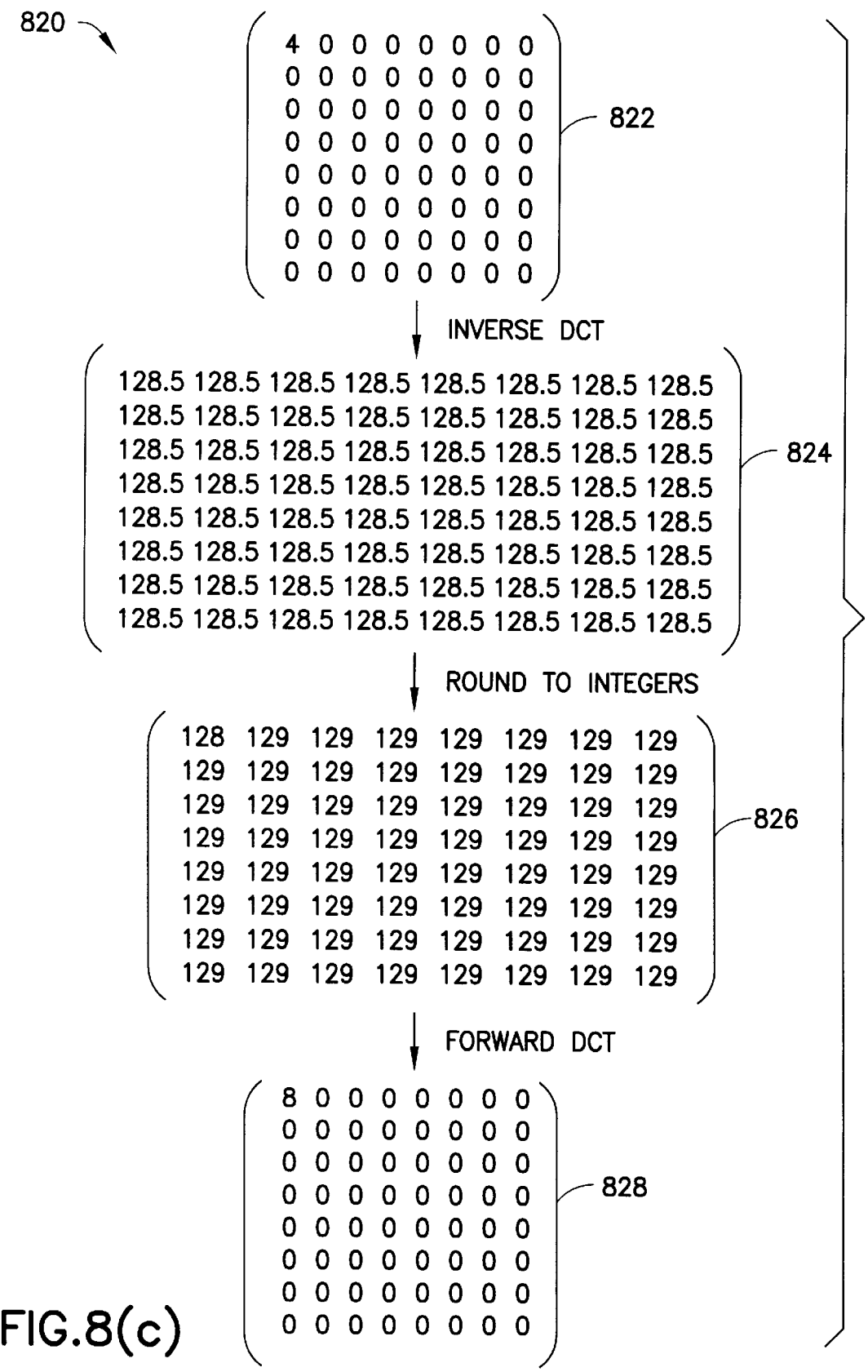
FIG. 8(c) is a numerical example of how real-domain rounding can cause significant errors in 8×8 block DCT coded data.

Since the maximum possible error from rounding is 0.5 for each of 64 samples, the largest error in the unquantized forward transform coefficients from conversion to integers by rounding is 4 (shown in FIG. 8(c)). For the quantization matrices shown in FIGS. 8(a) and 8(b) this size error is less than half of all of the values and will disappear during quantization. However, for high quantity applications such as high end printing or digital studio editing, the quantization matrix values are much smaller. In some cases, the DC (upper left corner) term is as small as 1 to preserve maximum quality. Then the rounding errors are significant.

The maximum possible error from truncating is just under 1 for each sample. This almost doubles the error in the unquantized forward transform coefficients. For the quantization matrix in FIG. 8(a) eight quantization values are small enough for this error to potentially change the transform-coded data.

A numerical example showing the multi-generation problem is given in FIG. 8(c). In this example the transform used is the 8×8 DCT as used in the JPEG still image compression standard. A set of transform-domain coefficients 822, of which only one (the constant, or DC, term) is non-zero, are operated on by the inverse transform to produce an block of real-domain data 824. In this case the data consist of 64 values which are all equal to 128.5. Note that the JPEG level shift of 128 for 8 bit data has been applied. The real-domain data are rounded to the nearest integers 826, which in this case means that each value is rounded up to 129. The forward transform is then applied to produce new transform-domain coefficients 828. It can be seen that the resulting new transform coefficients 828 are significantly different from the initial transform coefficients 822. This is a highly undesirable result.

This example also applies to transform-coded data if the DC quantization value is set to 1, 2, or 4. Then the transform coefficients 822 would be produced from transform-coded values of 4, 2, or 1 respectively. The quantization of the new transform coefficients 828 would change the resulting DC quantization values to 2, 4, or 8 respectively.

Figure 8D:
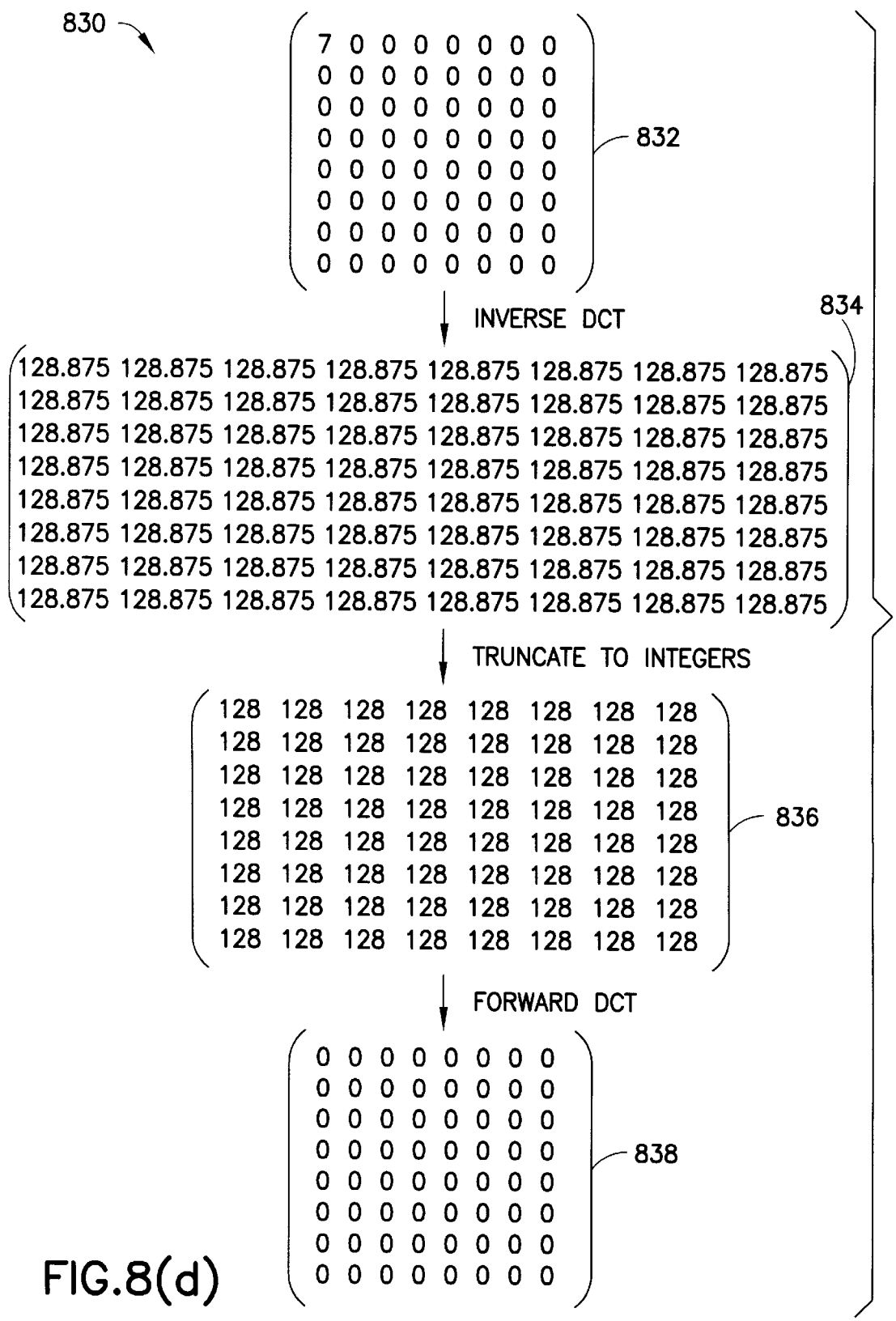
FIG. 8(d) is a numerical example of how real-domain truncation can cause significant errors in 8×8 block DCT coded data.

Another numerical example showing the multi-generation problem is given in FIG. 8(d). Again the transform used is the 8×8 DCT as used in the JPEG still image compression standard. A set of transform-domain coefficients 832, of which only one (the constant, or DC, term) is non-zero, are operated on by the inverse transform to produce a block of real-domain data 834. In this case the data consist of 64 values which are all equal to 128.875. Note that the JPEG level shift of 128 for 8 bit data has been applied. The real-domain data are truncated to the nearest integers 836, which in this case means that each value is reduced to 128. The forward transform is then applied to produce new transform-domain coefficients 838. It can be seen that the resulting new transform coefficients 838 are significantly different from the initial transform coefficients 832. This is a highly undesirable result.

Figure 8E:
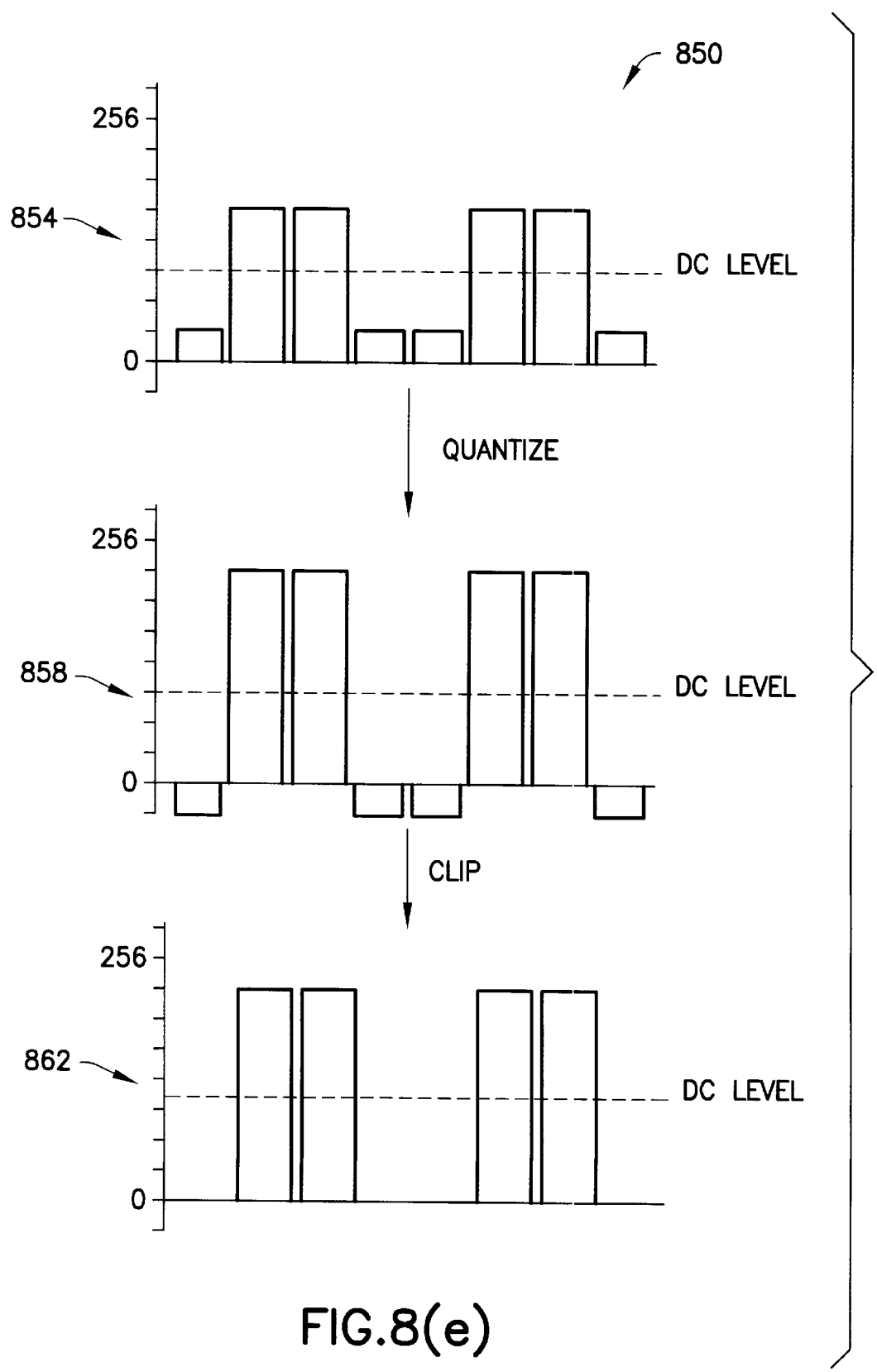
FIG. 8(e) is a series of graphs illustrating how real-domain clipping can cause errors in one-dimensional discrete cosine transform-coded data.

Having demonstrated the errors caused by real-domain rounding or truncating when converting to integers, we now show how real-domain clipping can cause errors. FIG. 8(e) shows an example of real-domain clipping 850. This example uses the one-dimensional DCT to illustrate the problem. FIG. 8(d) shows a bar chart 854 displaying one block of data consisting of eight samples. The data displayed has only two frequency components: a constant, or DC, component which is indicated by the dotted line; and an alternating, or AC, component which gives an alternating wave pattern symmetrical about the dotted line. The magnitudes of these components, namely the respective DCT coefficients, are high-precision values. When quantization is performed, these DCT coefficients are rounded to the nearest quantization level. The data after transform-domain quantization are shown in the bar chart 858. In the example shown, the DC coefficient has a small quantization value and so quantization does not change the DC level significantly. The AC coefficient shown has a large quantization value and so is changed significantly by quantization. This example shows the AC component almost doubling in magnitude due to quantization. These quantization values reflect, for example, those used when compressing chrominance image data. Thus the data represented after quantization have parts which have negative values. This shows how transform-domain data which, after inverse transforming, give real-domain negative values can be produced by original real-domain data which do not contain negative values.

Bar chart 862 shows the data produced from that in chart 858 after real-domain clipping. Those negative parts of the real data have been changed to 0. This results in the DC coefficient of the data increasing and hence leads to error being introduced. Because the quantization value for the DC coefficient is generally small, the error is large enough to cause a change in the quantized data as given in Equation (3).

Figure 8F:
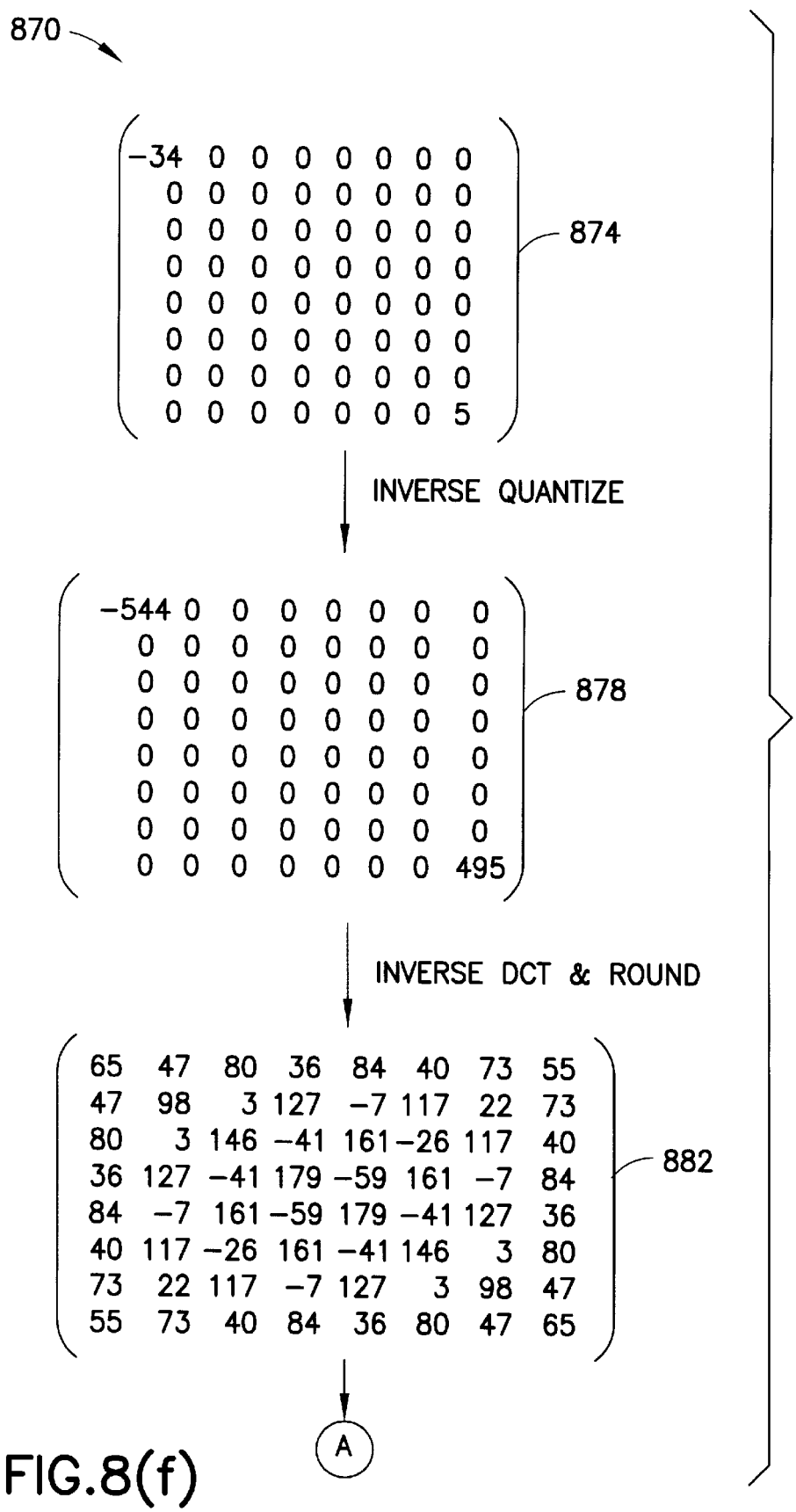
FIG. 8(f) and FIG. 8(g) are a numerical example of how real-domain clipping can cause significant errors in 8×8 block DCT coded data.
Figure 8G:
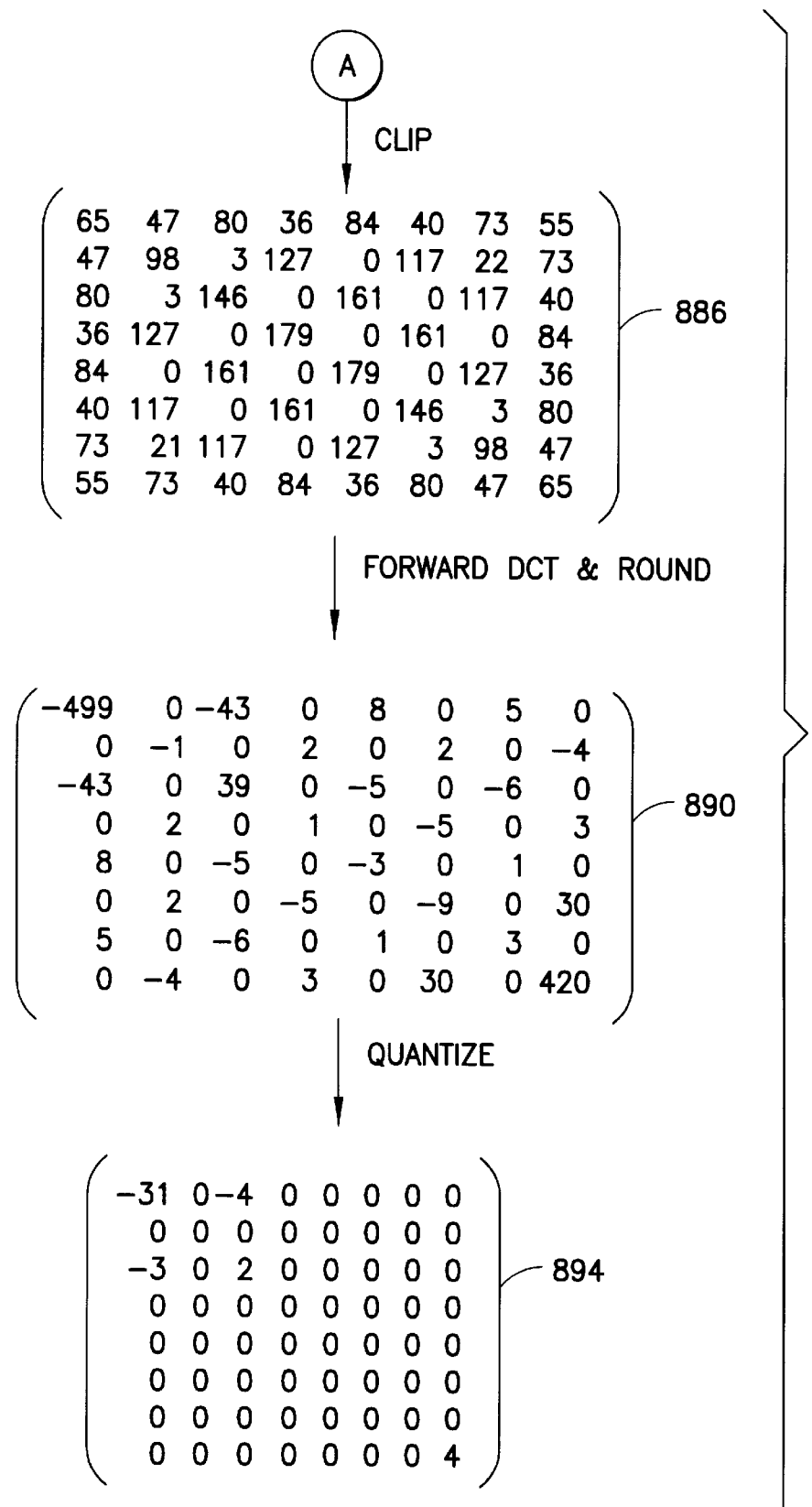

To further illustrate the possibility of error introduced by real-domain clipping, a numerical example 870 is shown in FIGS. 8(f) and 8(g). This example employs the system illustrated in FIG. 5. This example uses the two-dimensional 8×8 DCT as used for transform coding of images to illustrate the problem described above. The initial quantized DCT coefficients are shown in matrix 874. All but two of the coefficients are 0; the two non-zero coefficients are the DC coefficient and one high-frequency coefficient. The coefficients, after dequantizing using the quantization matrix shown in FIG. 8(a), are shown in matrix 878. When the inverse DCT is performed on these transform data and the level shift of 128 added, real data are produced as shown in matrix 882. The data shown in matrix 882 have already been rounded to integers but have not been clipped to an allowed range. It can be seen that these real data include several negative values. After clipping, the real data 882 produce clipped real data as shown in matrix 886. These data are identical to 882 except that each negative value has been replaced by 0. The forward DCT is then applied to the real-domain data to give new rounded transform data 890. It can be seen that the new transform data are significantly different from the previous transform data 878. When quantization is performed using the quantization matrix shown in FIG. 8(a), new transform-coded data 894 are produced. The resulting changes in the transform data are large enough to produce changes in the transform-coded data after quantization. This is a highly undesirable result.

In many situations, the process of decoding, manipulation and re-encoding of data needs to be done multiple times. In these situations each iteration of this process is referred to as a "generation". The errors described above, caused by converting to integers and clipping to an allowed range in the real domain, accumulate as multiple iterations are performed and may result in significant degradation of the data. It is realized that the foregoing are only representative examples of errors introduced by rounding (or truncating)

and/or clipping. Other examples having more or less error developed are possible.

Figure 9:
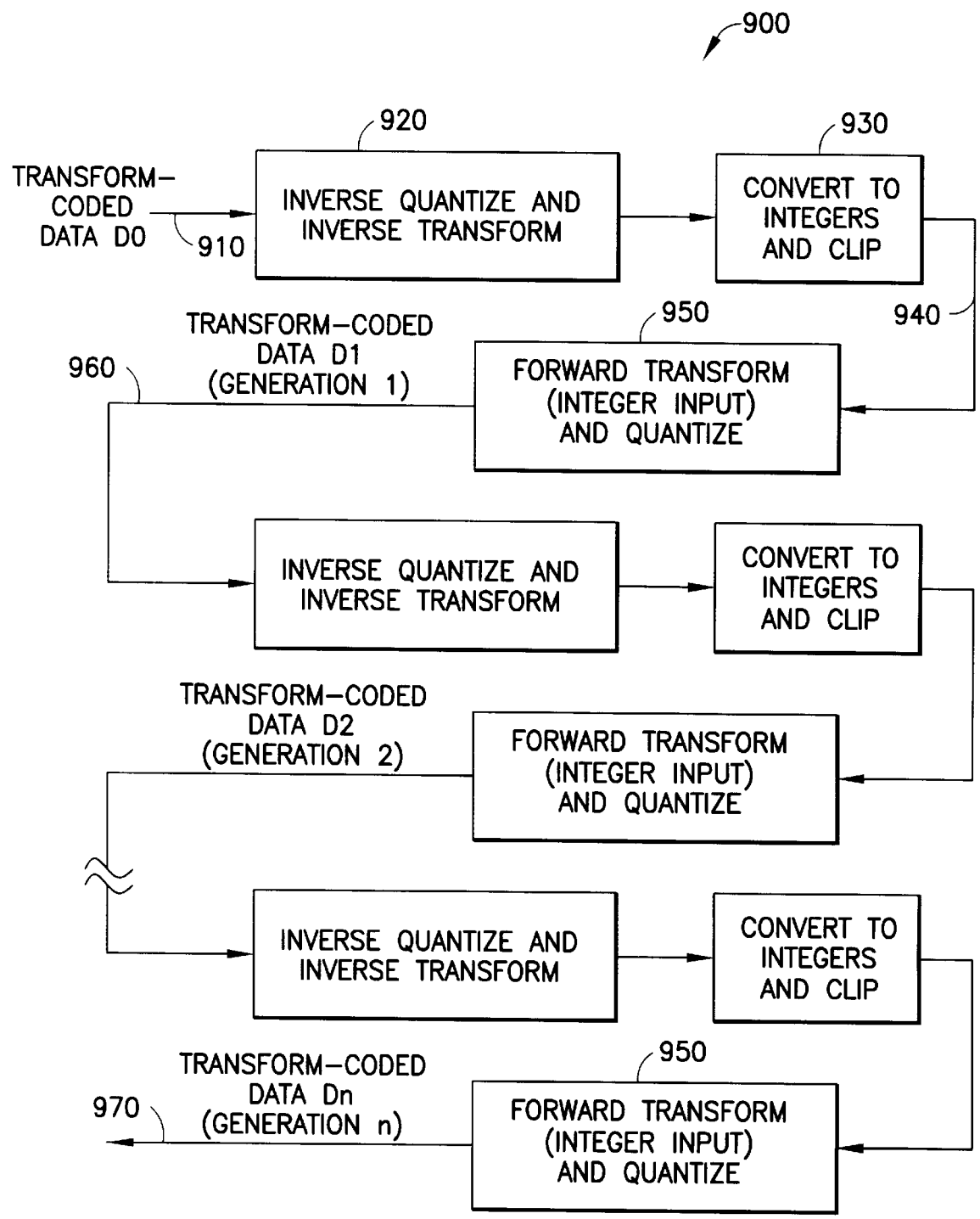
FIG. 9 is a block diagram showing a method performing multiple iterations of the process described in FIG. 5, and exhibiting the multi-generation problem.

The problem is usually even worse following multiple generations of decoding and re-encoding as shown in FIG. 9. Initial transform-coded data 'D0' 910 is dequantized and inverse transformed 920, converted to integers and clipped to an allowed range 930 to produce integer-valued real-domain data 940. The real-domain data 940 are passed to the forward transform and quantized 950 to give new transform-coded data 'D1' 960. This whole process is iterated several times, and after some number 'n' of iterations the final transform-coded data 'Dn' 970 is produced. Because of errors in each step the final data 'Dn' 970 may be very different from the original data.

Figure 10:
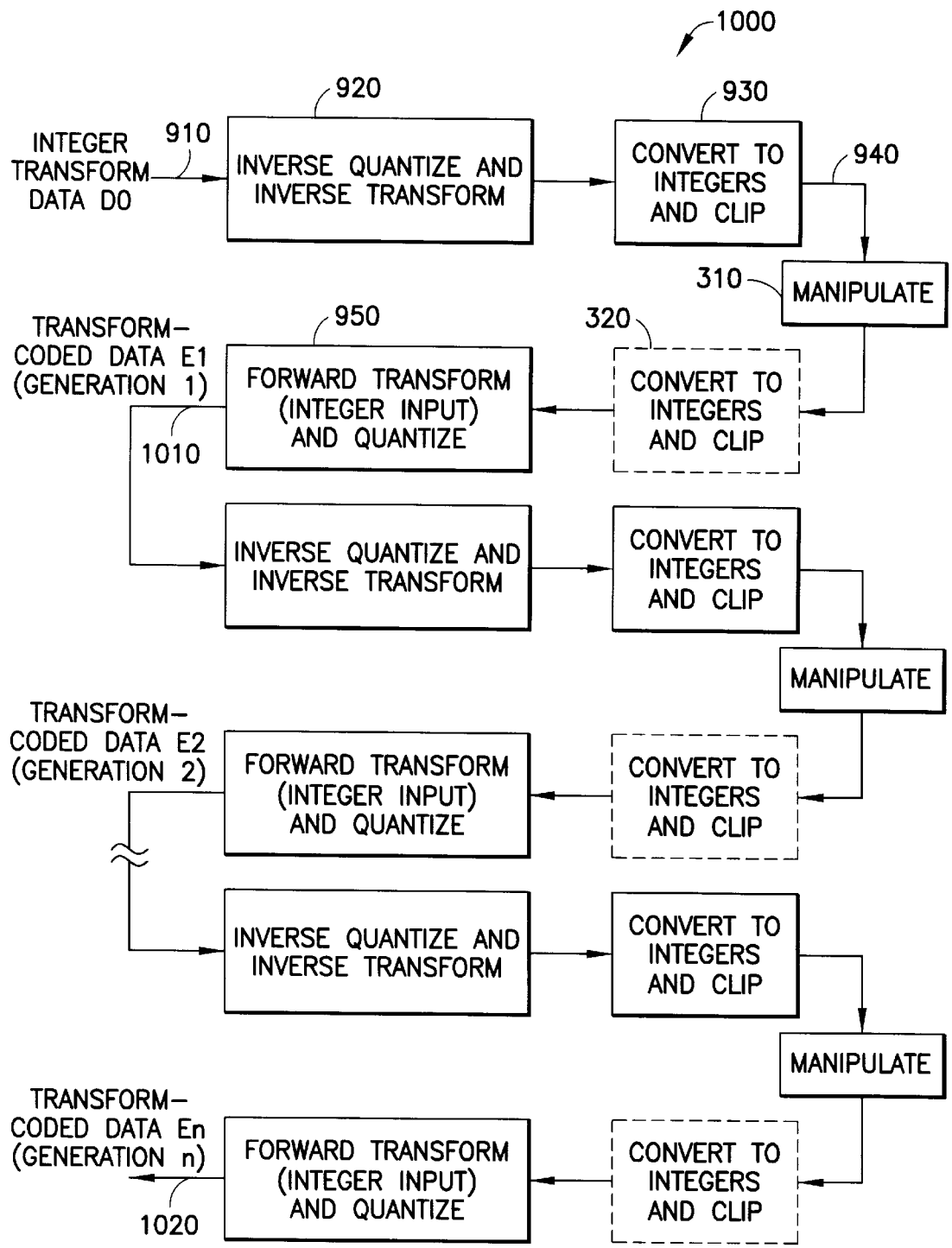
FIG. 10 is a block diagram showing a method for performing multiple iterations of real-domain manipulations, and exhibiting the multi-generation problem.

A case showing the problem significantly worsened due to multiple generations of real-domain manipulation of transform-coded data is shown in FIG. 10. In addition to the steps shown in FIG. 9, some form of manipulation 310 is performed on the real-domain data, followed by converting to integers and clipping 320. After the forward transform and quantization, the resulting quantized transform coefficients 1010 contain some error as in FIG. 5. After 'n' generations, the final transform quantized coefficients 1020 may have quite large undesired errors.

DETAILED DESCRIPTION OF THE INVENTION

Figure 11A:
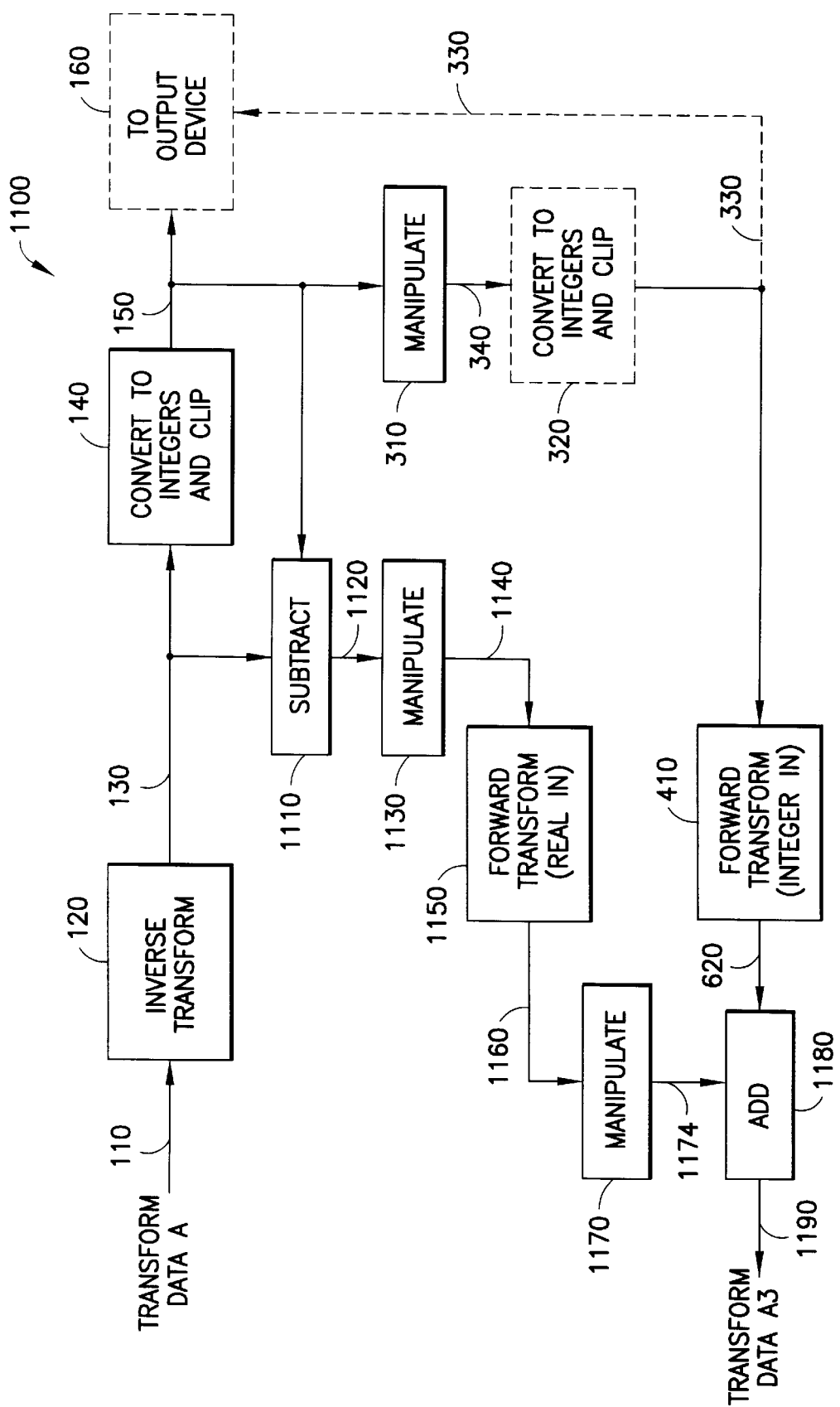
FIG. 11(a) is a block diagram showing an example of a method for the transform-domain correction of real-domain errors in the processing of transform data in accordance with the present invention.

An example embodiment of a method for transform-domain correction of real-domain errors in the processing of transform data 1100 is illustrated in FIG. 11(a). Transform data 'A' 110 are passed through an inverse transform 120 to produce high-precision real-domain data 130, as in FIG. 1(a). The high-precision data 130 are converted to integers and clipped 140 to produce integer real-domain data (i.e. converted data) 150. In some cases, the integer-valued data are optionally sent to an output device 160. Integer data 150 undergo some form of manipulation 310. If this manipulation 310 does not produce integer output, the manipulated output 340 is again converted to integers and clipped 320. The resulting integer data 330 may be stored, transmitted, and/or optionally sent to an output device 160. The processed converted data 330 are input to a forward transforming step 410 which accepts integer data as input and produces transformed processed converted data 620 as output.

Because the stage of clipping and converting to integers 140 is performed before the manipulation which accepts integer input 150, the resulting errors cause the data output from the manipulation after conversion to integers 330 to contain at least small inaccuracies. The inaccuracies can be corrected in the transform domain by subtracting 1110 the converted data 150 from the high-precision values 130, forming high-precision errors 1120. These errors 1120 are passed to a manipulator 1130 which accepts high-precision error data as input, to produce new manipulated high-precision errors 1140. The manipulated high-precision errors 1140 are used as input to the forward transform 1150, which accepts real-valued data as input. The resulting transform error data 1160 may be manipulated again 1170 before the manipulated transformed errors 1174 are added 1180 to the transformed processed converted data 620 to produce transform data 'A3'.

There is no requirement that any or all of the manipulating steps 310, 1130, and 1170 be present. If none are present, the transform data 'A3' 1190 are identical to the original transform data 'A' 110 which were the input to the inverse transform 120. This is so providing the forward transforming steps 410 and 1150 are the inverse of the inverse transforming step 120 and since the errors from rounding and clipping are not present in the transform data 'A3' 1190. The forward transforms 410 and 1150 produce different transform data 'A3' 1190 when a different forward transform is used. This allows conversion between transforms with correction in the transform domain of the errors from rounding and clipping.

If the manipulation step 310 creates the merging of two data sets, then either the manipulation step 1130 or the manipulation step 1170 is used to create the merging of the two error sets for embodiments in which the forward transform operates on blocks and the merging occurs on a block boundary. For forward transforms which operate on the whole data as one block, the real-domain manipulation 1130 on the errors creates a single data set for the forward transform 1150.

In some embodiments of the present invention, the adding step 1180 is implemented as an intelligent addition. In an embodiment of intelligent addition, a threshold is defined for tolerable error that does not impact future uses for the transformed processed converted data. In this embodiment, only errors of larger magnitude than the defined threshold are added to the transformed processed converted data. Alternate intelligent addition implementation rules are also sometimes used. All special addition implementations are herein referred to as adding intelligently. Thus for these embodiments, whenever an adding step is indicated herein, it is implemented as an intelligent addition employing adding intelligently.

The above embodiments have the advantage that the traditional manipulating (i.e. processing) followed by forward transforming are undisturbed. The high-precision errors are created before the manipulation step, and then added back into the transformed processed data after the traditional processing and forward transforming.

For some manipulations, the manipulation on the high-precision differences is best executed in the real domain. For other manipulations, the transform domain is the preferred place to manipulate the differences. For example, in an embodiment wherein the manipulating step 310 performs a 90 degree rotation on the converted data, then the high-precision differences also are rotated by 90 degrees. If the manipulating step 310 merges two data sets, such as in the chroma-keying method, then the high-precision differences are merged to correspond to the manipulated converted data. For some manipulations such as color correction of the converted data, the corresponding difference data may be cleared or zeroed since the differences no longer correspond to the changed converted data.

Figure 11B:
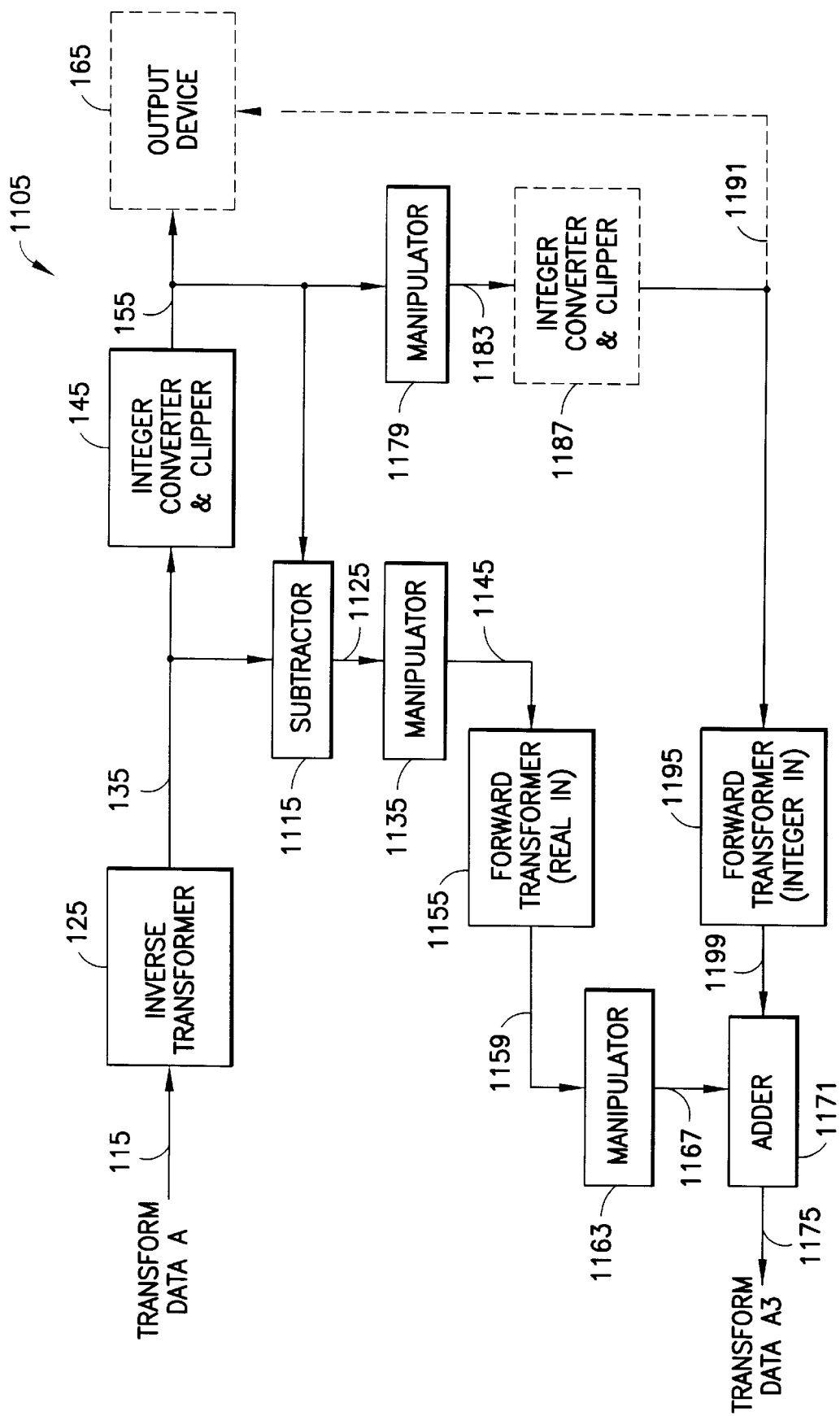
FIG. 11(b) is a block diagram showing an example of a system for the transform-domain correction of real-domain errors in the processing of transform data in accordance with the present invention.

An example embodiment of a system for transform-domain correction of real-domain errors in the processing of transform data 1105 in accordance with the present invention is illustrated in FIG. 11(b). Transform data 'A' 115 are passed through an inverse transformer 125 to produce high-precision real-domain data 135, as in FIG. 1(b). The integer converter and clipper 145 operates on the high-precision data 135 to produce integer real-domain data 155. In some cases, the integer-valued data are optionally sent to an output device 165. The manipulator 1179 operates on the real-domain converted data 155 accepting integer data as input and producing either integer data or high-precision data 1183 as output. This manipulator 1179 performs the same processing on the data as the manipulation on integers 310 described above in FIG. 3. The processed converted data 1191 are input to a forward transformer 1195 which accepts integer data as input and produces transformed processed converted data 1199 as output. Because the stage of clipping and converting to integers 145 is performed before the manipulation which accepts integer input 155, the resulting errors generally cause the data output from the manipulation after conversion to integers 1191 to contain at least small inaccuracies. The inaccuracies can be corrected in the transform domain by subtracting 1115 the converted data 155 from the high-precision values 135, forming high-precision errors 1125. These errors 1125 are passed to a manipulator 1135 which accepts high-precision error data as input, to produce new manipulated high-precision errors 1145. The high-precision errors 1145 are used as input to the forward transform 1155, which accepts real-valued data as input. The resulting transform error data 1159 may be passed through another manipulator 1163 before the manipulated transformed errors 1167 are input to an adder 1171 along with the transformed processed converted data 1199. The output of the adder is transform-domain corrected transform data 'A3' 1175.

There is no requirement that any or all of the manipulators 1179, 1135, and 1163 be present. If none are present, the transform data 'A3' 1175 are identical to the original transform data 'A' 115 which were the input to the inverse transform 125. This is so provided the forward transformers 1195 and 1155 are the inverse of the inverse transformer 125 and since the errors from rounding and clipping are not present in the transform data 'A3' 1175. The forward transforms 1195 and 1155 produce different transform data 'A3' 1175 when a different forward transform is used. This allows conversion between transforms with correction in the transform domain of the errors from rounding and clipping.

In some embodiments of the present invention, the adder 1171 is implemented as an intelligent adder. In an embodiment of the intelligent adder, a threshold is defined for tolerable error that does not impact future uses for the transformed processed converted data. In this adder embodiment, only errors of larger magnitude than the defined threshold are added to the transformed processed converted data. Alternate intelligent adder implementation rules are also sometimes used. All special adder implementations are herein referred to being performed by intelligent adders. Thus for these embodiments, whenever an adder is used herein, it is implemented as an intelligent adder.

FIG. 12(*a*) shows a method for transform-domain correction of real-domain errors in the processing of transform-coded data 1200. This method is formed by extending the method 1100 described in FIG. 11(*a*). In this embodiment, the transform-coded data 'B' 210 are inverse quantized 220 to form transform data 110. As in FIG. 11(*a*) the converted data 150 can be manipulated 310 using traditional integer processes. Before processing the converted data 150 are subtracted from the high-precision output 130 from the inverse transform 120 to form high-precision differences 1120. The high-precision differences 1120 are passed to a manipulation step 1130 which accepts high-precision difference data as input, to produce new manipulated high-precision differences 1140. The manipulated high-precision differences 1140 are input to a forward transform step 1150 which accepts high-precision numbers as input. The transformed high-precision differences 1160 are quantized 1210 to produce transform-coded error data 1220. The transform-coded error data 1220 are likely to have many zeros because the high-precision difference data are small values (0.5 or less for rounding and less than 1.0 for truncating) except where clipping has occurred in the converted data. The transform-coded error data are inverse quantized 1230 to form dequantized transform error data 1240. The dequantized transform error data 1240 may be manipulated 1170 to form manipulated dequantized transform error data 1250. The processed converted transformed data 620 output from the forward transform 410 that took integer input are added 1180 to the manipulated dequantized transform error data 1250. The transform-domain corrected processed converted transformed data 1260 are quantized 1270 to form transform-coded data 'B2' 1280.

Depending upon the desired system implementation, the forward transform operations 1150 and 410 may employ a different transform than that used in the inverse transform operation 120. For example, the inverse transform 120 may use the inverse DCT transform whereas the forward transforms 1150 and 410 may use the Fourier transform. The resulting transform-coded data 'B2' 1280 are identical to the original transform-coded data 'B' 210 which were the input to the inverse quantize step 220 if: the forward transform operation 115,0 is the inverse of the inverse transform operation 120; the forward transform operation 410 is the inverse of the inverse transform operation 120; the quantization values used in the inverse quantization step 220 and the quantization step 1270 are identical; and the manipulations 310, 1130 and 1170 do nothing. It is noted that the forward transform 410 will produce different transform-coded data 'B2' 1280 when a different forward transform is used. Similarly, use of different quantization values in the inverse quantization 220 and quantization 1270 also produces different transform-coded data 1280. This method thus allows conversion between transforms and quantization matrices without the errors from rounding and clipping being present in the input 1260 to the quantization 1270.

It is noted that the conversion between quantization matrices may be for coarser or finer quantizations. For example, when converting data from the JPEG international standard to the MPEG international standard, the quantization is likely to be coarser. The higher quality JPEG independent images are needed during the editing process. The coarser, more compressible, MPEG images are used to achieve the desired bandwidth objectives. On the other hand, in recompressing JPEG images after significant hand editing, the quantization is likely to be finer in order to preserve the changes.

The asterisks after the term 'quantize' in steps 1210 and 1230 are reminders that it is advantageous that quantization for these steps is half the quantization used in the final quantization step 1270. In this case the dequantized transform error data have sufficient accuracy to correct the real domain errors in the converted data.

In an alternative embodiment, the manipulation 310 of the converted data 150 and forward transforming 410 of the integer manipulated converted data 330 is done in parallel with the subtracting 110 to create high-precision differences and forward transforming 1150 of the high-precision differences. In this embodiment, the quantizing 1210 and inverse quantizing 1230 steps are eliminated. The transformed error data 1160 are input directly into the manipulation step 1170 as in FIG. 11(*a*).

The quantization of the transform error data to form transform-coded error data is particularly useful when the manipulations are done sequentially and only limited memory is available to store both the integer converted data and the high-precision difference data. The transform-coded error data is highly compressible. Since most coefficients are zero, a 64-bit word can efficiently store with 1-bit flags the locations of the zero and non-zero coefficients. Depending upon the quantization selected, the non-zero coefficients can follow this 64-bit word as either byte or two-byte integers.

Figure 12A:
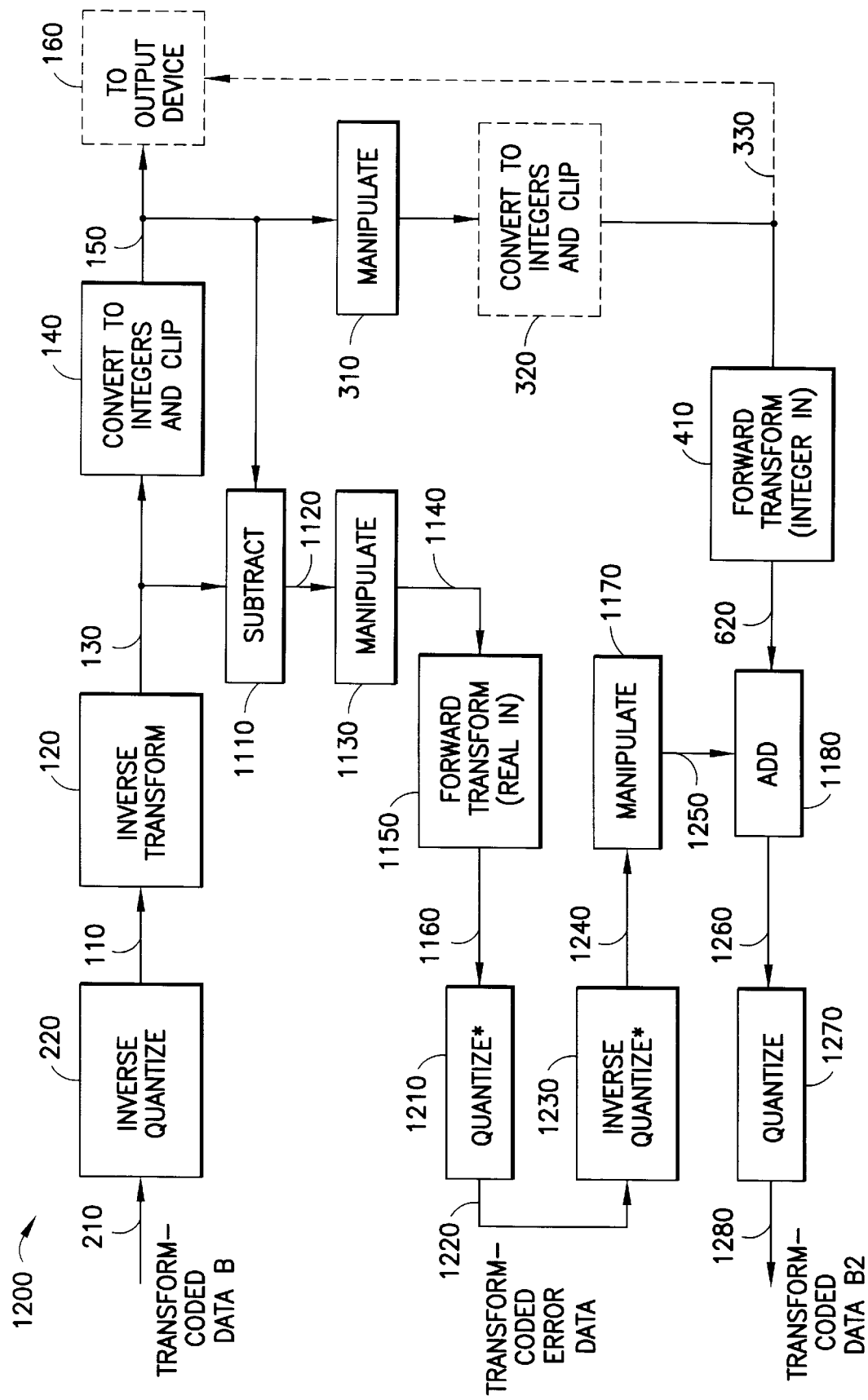
FIG. 12(a) is a block diagram showing an example of a method for the transform-domain correction of real-domain errors in the processing of transform-coded data in accordance with the present invention.
Figure 12B:
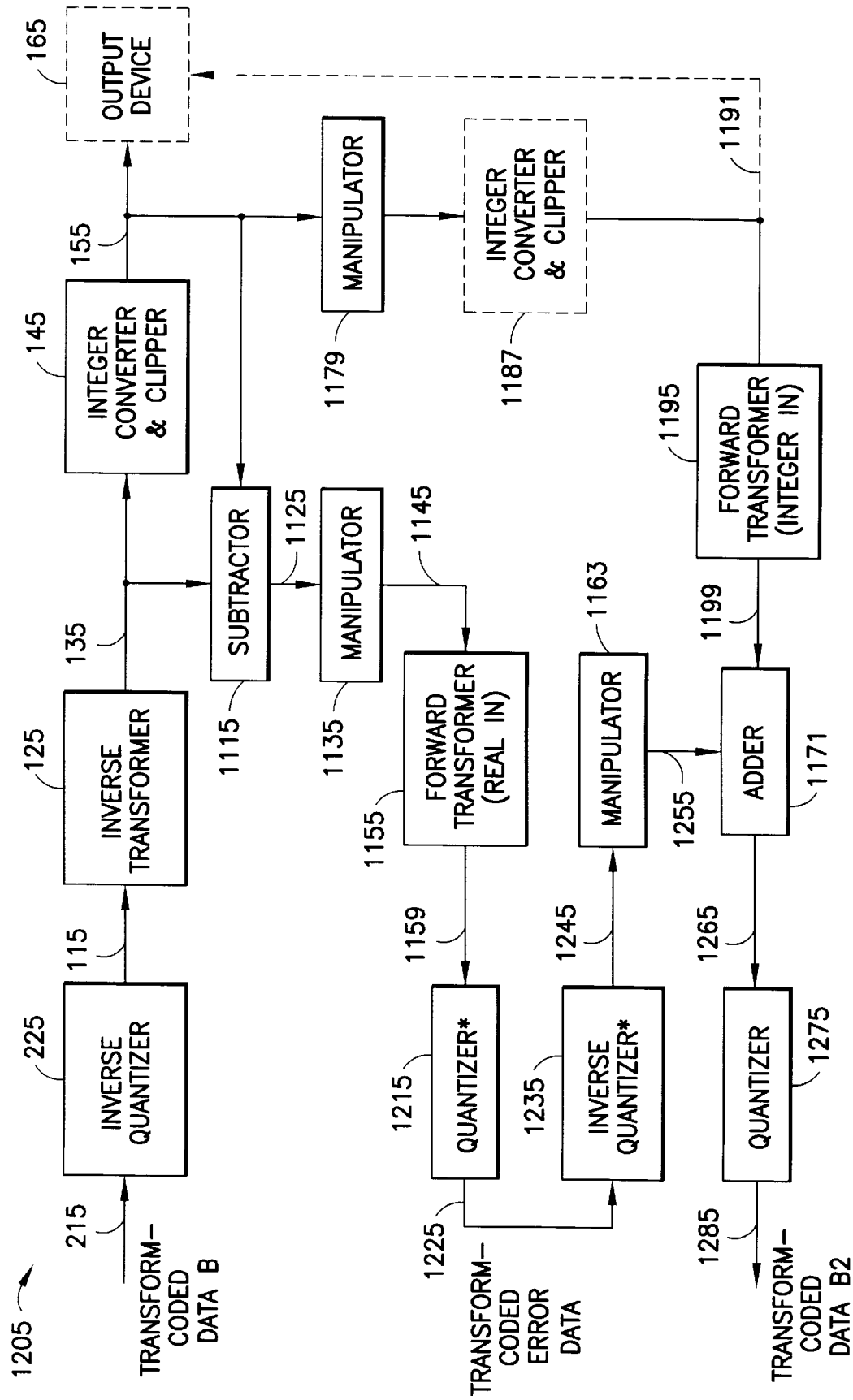
FIG. 12(b) is a block diagram showing an example of a system for the transform-domain correction of real-domain errors in the processing of transform-coded data in accordance with the present invention.

FIG. 12(b) shows a system 1205 for transform-domain correction of real-domain errors in the processing of transform-coded data. This system is formed by extending the system 1105 described in FIG. 11(b). In this embodiment, the transform-coded data 'B' 215 are inverse quantized 225 to form the transform data 115. As in FIG. 11(b) the converted data 155 can be manipulated 1179 using traditional integer processes. Before further processing or manipulating, the converted data 155 are subtracted from the high-precision output 135 from the inverse transform 125 to form high-precision differences 1125. The high-precision differences 1125 are passed to a manipulation step 1135 which accepts high-precision data as input, to produce new manipulated high-precision differences 1145. The manipulated high-precision differences are input to a forward transform step 1155 which accepts high-precision numbers as input. The transformed high-precision differences 1159 are quantized 1215 to produce transform-coded error data 1225. The transform-coded error data 1225 are likely to have many zeros because the high-precision difference data are small values (0.5 or less for rounding and less than 1.0 for truncating) except where clipping has occurred in the converted data. The transform-coded error data are inverse quantized 1235 to form dequantized transform error data 1245. The dequantized transform error data 1245 may be manipulated 1163 to form manipulated dequantized transform error data 1255. The processed converted transformed data 1199 output from the forward transform 1195 that took integer input are added 1171 to the dequantized transform error data 1255. The transform-domain corrected processed converted transformed data 1265 are quantized 1275 to form transform-coded data 'B2' 1285.

Depending upon the desired system implementation, the forward transformer 1195 may employ a different transform than that used in the inverse transformer 125. For example, the inverse transformer 125 may implement the inverse DCT transform whereas the forward transformer 1195 may implement the Fourier transform. The resulting integer transform data 'B2' 1285 are identical to the original integer transform data 'B' 215 which were the input to the inverse quantizer 225 if: the forward transformer 1195 is the inverse of the inverse transformer 125; the forward transformer 1155 is the inverse of the inverse transformer 125; the quantization values used in the inverse quantizer 225 and the quantizer 1275 are identical; and the manipulators 1179, 1135, and 1163 do nothing. It is noted that the forward transformer 1195 will produce different integer transform data 'B2' when a different forward transform is used. Similarly, use of different quantization values in the inverse quantizer 225 and quantizer 1275 also produces different integer transform data 1285. This method thus allows conversion between transforms and quantization matrices without the errors from rounding and/or clipping being present in the quantizer 1275 input 1265.

The asterisks after the term 'quantizer' in steps 1215 and 1235 are indicators that an advantageous quantization for these blocks is half the quantization used in the final quantizer 1275. Then the dequantized transform error data have sufficient accuracy to correct the real domain errors in the converted data.

In an alternative embodiment, the manipulator 1179 of the converted data 155 and forward transformer 1195 of the integer manipulated converted data 1191 are executed in parallel with the manipulator 1135 and forward transformer 1155 of the high-precision differences. In this embodiment, the quantizer 1215 and inverse quantizer 1235 are eliminated. The transformed error data 1159 are input directly into the manipulator 1163 as in FIG. 11(b).

The quantization of the transform error data to form transform-coded error data is particularly useful when the manipulations are done sequentially and only limited memory is available to store both the integer converted data and the high-precision difference data.

Figure 13A:
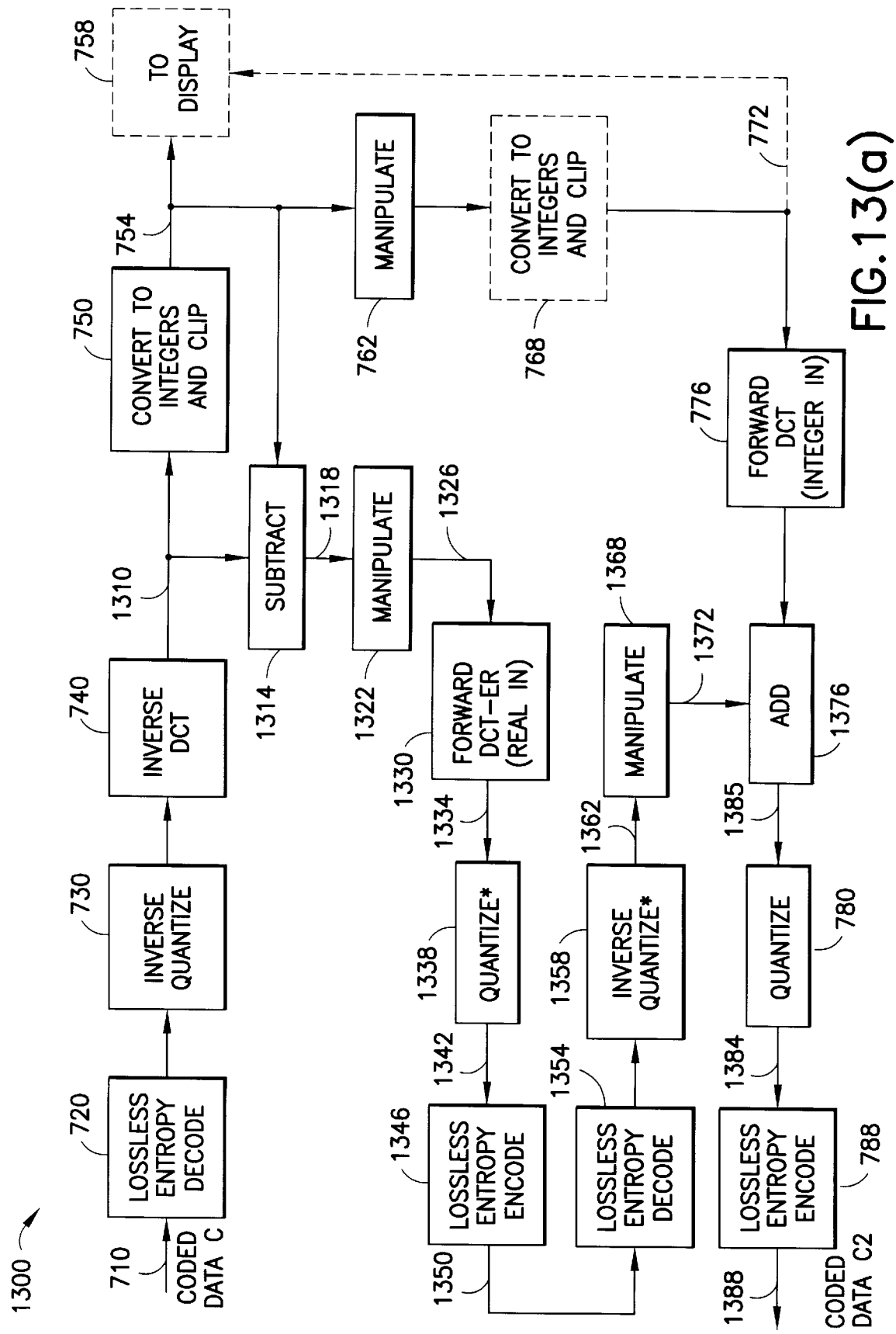
FIG. 13(a) is a block diagram showing an example embodiment of a method for the transform-domain correction of real-domain errors in the real-domain processing of coded data, such that undesired errors in the new transform-coded data are reduced or eliminated in accordance with the present invention.

An example embodiment of a method for transform-domain correction of real-domain errors in the processing of coded data 1300 in accordance with the present invention is illustrated in FIG. 13(a). The chosen embodiment is a method for real-domain manipulation of coded images, which are transform-coded using the DCT such as JPEG-coded images. Coded data 'C' 710 are decoded by a lossless entropy decode step 720 to produce quantized DCT coefficients. These coefficients are dequantized 730 and passed through an inverse DCT 740 to produce high-precision real-domain data 1310. The integer converter and clipper 750 operates on the high-precision data 1310 to produce integer real-domain data 754. In some cases, the integer-valued data are optionally sent to a display 758.

The manipulation step 762 operates on the real-domain converted data 754 accepting integer data as input and producing either integer data or high-precision data as output. If the manipulated data are not integer, they are converted to integers and clipped 678 before optionally passing them to a display 758 which takes integer-valued input 772.

The subtracting step 1314 subtracts the converted integer data 754 from the high-precision values 1310 forming high-precision differences 1318. The high-precision differences 1318 are passed to a manipulation step 1322 which accepts high-precision difference data as input, to produce new manipulated high-precision differences 1326. The manipulated high-precision differences 1326 are input to a forward transform step 1330 which accepts high-precision numbers as input. The transformed high-precision differences 1334 are quantized 1338 to produce transform-coded error data 1342. The lossless entropy encode step 1346 compresses the transform-coded error data 1342. Then the coded error data 1350 can be stored, saved, or transmitted efficiently.

The lossless entropy decode step 1354 decodes the coded error data 1350 and outputs quantized transform coefficients. These coefficients are dequantized (i.e. inverse quantized) 1358 to produce dequantized transform error data 1362. The dequantized transform error data 1362 may be manipulated 1368 to form manipulated dequantized transform error data 1372.

The processed converted data 772 are input to the forward DCT 776 which accepts integer data as input. The output values from the forward DCT 776 are added 1376 to the manipulated dequantized transform error data 1372 forming transform-domain corrected transformed data 1380. The transform-domain corrected transformed data 1380 are quantized 780 to produce new integer DCT coefficients 1384. These coefficients 1384 are encoded by a lossless entropy encode step 788 to produce new coded data 'C2' 1388.

It is noted that if the forward and inverse DCT and the manipulation system are sufficiently accurate so that the error they introduce is less than half a quantization step, as described in Equation (3) given above, no error at all is introduced to the DCT coefficients.

Figure 13B:
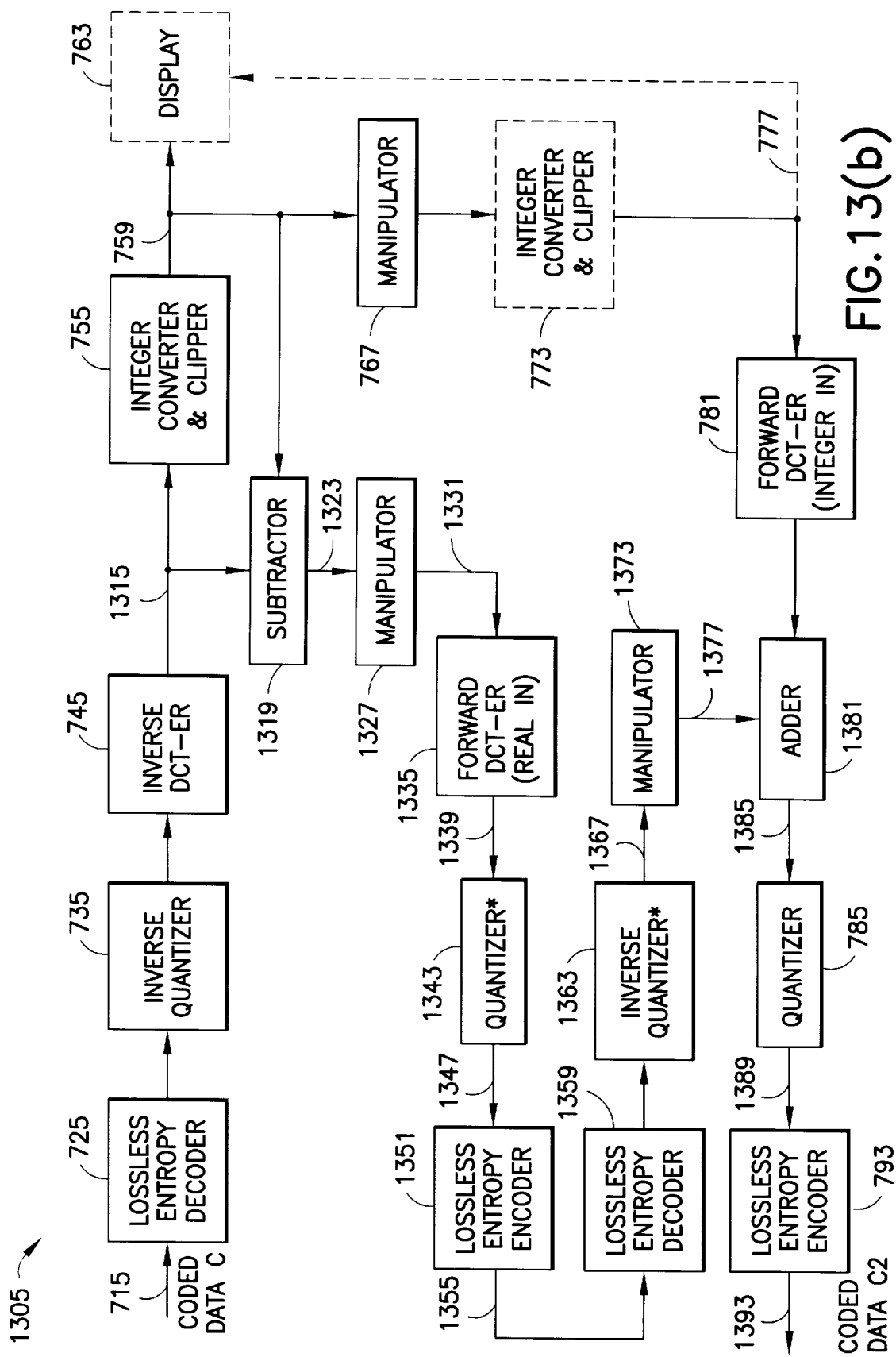
FIG. 13(b) is a block diagram showing an example embodiment of a system for the transform-domain correction of real-domain errors in the real-domain processing of coded data, such that undesired errors in the new transform-coded data are reduced or eliminated in accordance with the present invention.

An example invention embodiment of a system for transform-domain correction of real-domain errors in the processing of coded data 1305 is illustrated in FIG. 13(b). Coded image data 'C' 715 are decoded by a lossless entropy decoder 725 to produce quantized DCT coefficients. These coefficients are sent to an inverse quantizer 735 and then passed through an inverse DCT-er 745 to produce high-precision real-domain data 1315. The integer converter and clipper 755 operates on the high-precision data 1315 to produce integer real-domain data 759. In some cases, the integer-valued data are optionally sent to a display 763. The subtractor 1319 subtracts the high-precision values 1315 from the converted integer data 759 forming high-precision differences 1323.

The manipulator 767 operates on the real-domain converted data 759 accepting integer data as input and producing either integer data or high-precision data as output. If the manipulated data are not integer, they are converted to integers and clipped 773 before optionally passing them to a display 763 which takes integer-valued input 777.

The subtractor 1319 subtracts the converted integer data 759 from the high-precision values 1315 forming high-precision differences 1323. The high-precision differences 1323 are passed to a manipulator 1327 which accepts high-precision difference data as input, to produce new manipulated high-precision differences 1331. The manipulated high-precision differences 1331 are input to a forward DCT-er 1335 which accepts high-precision numbers as input. The transformed high-precision differences 1339 are quantized 1343 to produce transform-coded error data 1347. The lossless entropy encoder 1351 compresses the transform-coded error data 1347. Then the coded error data 1355 can be stored, saved, or transmitted efficiently.

The lossless entropy decoder 1359 decodes the coded error data 1355 and outputs quantized transform coefficients. These coefficients are dequantized (i.e. inverse quantized) 1363 to produce dequantized transform error data 1367. The dequantized transform error data 1367 may be manipulated 1373 to form manipulated dequantized transform error data 1377.

The processed converted data 777 are input to the forward DCT-er 781 which accepts integer data as input. The output values from the forward DCT-er 781 and the manipulated dequantized transform error data 1377 are input to the adder 1381. The transform-domain corrected transformed data 1385 output from the adder 1381 are input to a quantizer 785 to produce new integer DCT coefficients 1389. These coefficients 1389 are input to the lossless entropy encoder 793 which produces new coded data 'C2' 1393.

In an alternate embodiment of the present invention a method for performing real-domain manipulations of transform-coded data with transform-domain correction of real-domain errors in multiple steps, alternating the manipulating the converted data and correcting the error in the transform domain with forward transforming and quantizing steps and inverse quantizing and inverse transforming steps, is implemented. Refer back to FIG. 10 where the integer output is passed to each of the forward transforms 950, the steps from FIG. 11(a) of creating high-precision errors input to a forward transform step that takes high-precision input and then adds the transformed errors intelligently into the transformed converted data removes the errors from converting to integers and clipping. FIG. 12(a) illustrates one cycle of such a multi-generation system. FIG. 13(a) illustrates another embodiment of one cycle of a multi-generation method.

Still another alternate embodiment of the present invention implements a system for performing real-domain manipulations of transform-coded data with transform-domain correction in multiple steps, alternating the subtractor, manipulators, and adder with a forward transformer and quantizer and a inverse quantizer and inverse transformer. Refer to FIG. 12(b) which illustrates one cycle of a multi-generation system.

In general each manipulation may perform another operation on the data. For example for digital studio editing, the first manipulation might color correct the image. The second manipulation might merge the color corrected image with a background using the chroma-keying method. The third manipulation might add highlights to the image. The fourth manipulation might crop the image to convert from the 16:9 width to height aspect ratio of movies to the 4:3 aspect ratio of television. For the printing of images the first manipulation might rotate the image 90 degrees to orient the image with the printing direction. The second manipulation might merge several independent images into one composite image. A third manipulation might do a color conversion. For coded image data the output device may be a display or television set. For coded audio data the output device may be a player and/or recorder.

Examples of the manipulation between generations include merging two or more transform-coded data sets. For transform-coded image data sets, the merging may be needed because multiple small images need to be collected into one bigger picture. Fan-folded advertising brochures typically are composed of multiple individual pictures. Today's highest end laser printers print more than one page at a time. In such cases, the images generally do not overlap, but may not have the same quantization, positioning relative to the reference grid such as the 8×8 block structure for JPEG DCTs, or orientation. By composing the final picture in the real domain, standard processes can be used for each subimage. Then the composite image can be re-compressed for eventual decompression for on-the-fly printing.

Similarly, digital editing can include many special effects requiring several independent manipulations performed serially. Digital movies often use the fade-in/fade-out special effect to perform a smooth transition between two key scenes. Such special effects may follow independent processing of each scene. Thus, multiple generations of decompression and recompression are often needed in the editing to produce the composite of the special effects.

Chroma-keying involves two independent video data streams. In one video stream the background has been captured. In the other video stream the foreground, often composed of action involving live actors, has been filmed against a blank single color such as a deep blue or black background. Then the blank pixels in the foreground image are replaced with pixels from the background video. Since the pixels are being mixed at a single-pixel level, the images need to be combined in the real domain. The errors introduced by converting to integers and clipping are highly undesirable for such digital studio applications. These errors are reduced or eliminated by implementing the present invention.

Another application example for use of the present invention is in the high-end digital graphics market which uses digital images with sometimes more than 100 megapixels. Glossy advertising brochures and the large photographic trade show booth backdrops are just two examples of the use of such high quality digital imagery. High-quality lossy JPEG compression are sometimes used to keep the transmission and storage costs down. As such images are decompressed and recompressed to allow changes and modifications such as adding highlights, correcting colors, adding or changing text and image cropping, unintentional errors are a problem that is solved with the use of the concepts of the present invention.

The above examples for the concepts of the present invention are usual for image and video transform data. The wide use of the Internet has shown the value of JPEG and MPEG compressed image data. When JPEG images are to be printed, manipulations such as a change of scale or a change of orientation may be required. In addition, a transformation to another color space followed by recompression will allow the print-ready versions of the image to be stored. Use of the present invention overcomes the problem inherent in propagating the errors from the rounding and clipping.

Audio coded data also needs to be decompressed, mixed with special sound effects,- merged with other audio data, edited and processed in the real domain with reduced errors. Similar implementations are performed for other industrial, commercial, and military applications of digital processing employing a transform and an inverse transform of data representing a phenomenon when the data is stored in the transform domain. These are thus other representative applications wherein use of the present invention is highly advantageous.

It is further noted that this invention may also be provided as an apparatus or a computer product. For example, it may be implemented as an article of manufacture comprising a computer usable medium having computer readable program code means embodied therein for causing a computer to perform the methods of the present invention.

It is noted that although the description of the invention is made for particular arrangements of steps, the intent and concept of the present invention are suitable and applicable to other arrangements. It will be clear to those skilled in the art that other modifications to the disclosed embodiments can be effected without departing from the spirit and scope of the invention.

We claim:

1. A method for digitally processing transform data representing a phenomenon, the method comprising:
   performing an inverse transform of said transform data to the real domain forming high-precision numbers;
   converting said high-precision numbers to integers and clipping the integers to an allowed range forming initial converted data;
   subtracting said converted data from said high-precision numbers forming high-precision differences;
   forward transforming said initial converted data forming transformed converted data;
   forward transforming said high-precision differences forming transformed differences; and
   adding said transformed differences to said transformed converted data forming corrected transformed data.

2. A method as recited in claim 1, wherein the inverse to said forward transform for forward transforming said initial converted data is different from said inverse transform.

3. A method as recited in claim 1, wherein said high-precision numbers are floating point numbers.

4. A method as recited in claim 1, wherein said high-precision numbers are fixed precision numbers including a fractional part.

5. A method as recited in claim 1, further comprising performing an inverse quantization of transform-coded data forming the transform data.

6. A method as recited in claim 5, further comprising performing a quantization of said corrected transformed data forming quantized data.

7. A method as recited in claim 6, further comprising:
   entropy decoding coded data forming the transform-coded data; and
   entropy encoding the quantized data forming encoded data.

8. A method as recited in claim 6, wherein said inverse quantization step and said quantization step use at least one difference quantization value.

9. A method for digitally processing transform data representing a phenomenon, the method comprising:
   performing an inverse transform of said transform data to the real domain forming high-precision numbers;
   converting said high-precision numbers to integers and clipping the integers to an allowed range forming initial converted data;
   subtracting said initial converted data from said high-precision numbers forming high-precision differences;
   manipulating said initial converted data to produce an effect and forming processed converted data;
   forward transforming said processed converted data forming transformed converted data;
   forward transforming said high-precision differences forming transformed differences; and
   adding said transformed differences to said transformed converted data forming corrected transformed data.

10. A method as recited in claim 9, further comprising performing an inverse quantization of transform-coded data to form the transform data.

11. A method as recited in claim 10, further comprising performing a quantization of said corrected transformed data forming quantized data.

12. A method as recited in claim 11, further comprising:
   entropy decoding coded data to form the transform-coded data; and
   entropy encoding the quantized data forming encoded data.

13. A method as recited in claim 9, wherein said effect is the color correction of image data.

14. A method as recited in claim 12, wherein said coded data are coded audio data.

15. A method as recited in claim 12, wherein said coded data are coded image data.

16. A method as recited in claim 12, wherein said coded data are coded video data.

17. A method as recited in claim 15, wherein said coded image data are in a JPEG still image international standard format.

18. A method as recited in claim 16, wherein said coded video data are in a MPEG motion video international standard format.

19. A method as recited in claim 12, said method steps further comprising alternating a desired number of times said step of manipulating with said steps of performing a forward transform, performing a quantization, entropy encoding, entropy decoding, performing an inverse quantization, and performing an inverse transform.

20. A method as recited in claim 19, wherein said coded data are compressed data, and each step of alternating implements a compression/decompression cycle.

21. A method for digitally processing transform data representing a phenomenon, the method comprising:
   performing an inverse transform of said transform data to the real domain forming high-precision numbers;
   converting said high-precision numbers to integers and clipping the integers to an allowed range forming initial converted data;

subtracting said initial converted data from said high-precision numbers forming initial high-precision differences;

manipulating said initial converted data to produce a first effect forming processed converted data;

forward transforming said processed converted data forming transformed converted data;

manipulating said initial high-precision differences to produce a second effect and forming processed high-precision differences;

forward transforming said processed high-precision differences forming transformed differences; and adding said transformed differences to said transformed converted data forming corrected transformed data.

22. A method as recited in claim 21, wherein said first effect is the chroma-key merging of two data sets.

23. A method as recited in claim 22, wherein said second effect is the merging of two initial high-precision differences according to the chroma-keying merging of two data sets.

24. A method as recited in claim 21, wherein said first effect is the color correction of image data.

25. A method as recited in claim 21, wherein said first effect is a 90 degree rotation of the image and said second effect is a 90 degree rotation of said high-precision differences.

26. A method as recited in claim 21, wherein said high-precision numbers are floating point numbers.

27. A method as recited in claim 21, further comprising performing an inverse quantization of transform-coded data to form the transform data.

28. A method as recited in claim 27, further comprising performing a quantization of said corrected transformed data forming quantized data.

29. A method as recited in claim 28, further comprising:
entropy decoding coded data to form the transform-coded data; and
entropy encoding the quantized data forming encoded data.

30. A method as recited in claim 29, wherein said coded data are in a JPEG still image international standard format.

31. A method as recited in claim 29, wherein said coded video data are in a MPEG motion video international standard format.

32. A method as recited in claim 21, wherein the processed high-precision differences are identical to the initial high-precision differences.

33. A method for digitally processing transform data representing a phenomenon, the method comprising:
performing an inverse transform of said transform data to the real domain forming high-precision numbers;
converting said high-precision numbers to integers and clipping the integers to an allowed range forming initial converted data;
subtracting said initial converted data from said high-precision numbers forming high-precision differences;
forward transforming said high-precision differences forming initial transformed differences;
manipulating said initial converted data to produce a first effect forming processed converted data;
forward transforming said processed converted data forming transformed converted data;
manipulating said initial transformed differences to produce a second effect forming processed transformed differences; and
adding said processed transformed differences to said transformed converted data forming corrected transformed data.

34. A method as recited in claim 33, wherein said high-precision numbers are floating point numbers.

35. A method as recited in claim 33, further comprising performing an inverse quantization of transform-coded data to form the transform data.

36. A method as recited in claim 35, further comprising performing a quantization of said corrected transformed data forming quantized data.

37. A method as recited in claim 36, further comprising:
entropy decoding coded data to form the transform-coded data; and
entropy encoding the quantized data forming encoded data.

38. A method as recited in claim 37, wherein said coded video data are in a MPEG motion video international standard format.

39. A method as recited in claim 36, wherein the step of manipulating said transformed differences includes:
performing a quantization of said transformed differences forming quantized differences;
performing an inverse quantization of said quantized differences forming dequantized differences; and
manipulating said dequantized differences to produce a second effect to form processed transformed differences.

40. A method as recited in claim 39, further comprising the step of entropy encoding the quantized differences forming encoded differences.

41. A method as recited in claim 40, further comprising the step of entropy decoding the encoded differences reforming the quantized differences.

42. A method as recited in claim 39, wherein the step of performing a quantization and the step of performing an inverse quantization use a first amount of quantization values which equal to one half a second amount of quantization values used in the step of performing a quantization of said corrected transformed data.

43. A method as recited in claim 36, wherein the step of manipulating said transformed differences further comprises:
manipulating said transformed differences to produce a second effect and forming manipulated transformed differences;
performing a quantization of the manipulated transformed differences forming quantized differences; and
performing an inverse quantization of said quantized differences forming processed transformed differences.

44. A method as recited in claim 43, further comprising the step of entropy encoding the quantized differences forming encoded differences.

45. A method as recited in claim 44, further comprising the step of entropy decoding the encoded differences reforming the quantized differences.

46. A method as recited in claim 43, wherein the step of performing a quantization of the manipulated transformed differences and the step of performing an inverse quantization of said quantized differences use half an amount of quantization values as used in the step of performing a quantization of said corrected transformed data.

47. A method as recited in claim 36, wherein the step of manipulating said transformed differences further comprises:
manipulating said transformed differences to produce a second effect and forming manipulated transformed differences;
performing a quantization of the manipulated transformed differences forming quantized differences;

performing an inverse quantization of said quantized differences forming dequantized differences; and manipulating said dequantized differences to produce a third effect and forming processed transformed differences.

48. A method as recited in claim 47, further comprising the step of entropy encoding the quantized differences forming encoded differences.

49. A method as recited in claim 48, further comprising the step of entropy decoding the encoded differences reforming the quantized differences.

50. A method as recited in claim 47, wherein the step of performing a quantization of the manipulated transformed differences and the step of performing an inverse quantization of the quantized differences use half an amount of quantization values of as is used in the step of performing a quantization of the corrected transformed data.

51. A system for digitally processing transform data representing a phenomenon, the system comprising:

an inverse transformer to perform an inverse transform of said transform data to the real domain using high-precision numbers;

a converter to convert said high-precision numbers to integers and a clipper to clip the integers to an allowed range forming initial converted data;

a subtractor to subtract said initial converted data from said high-precision numbers forming high-precision differences;

a forward transformer to forward transform said initial converted data forming transformed converted data;

a forward transformer to forward transform said high-precision differences forming transformed differences; and an adder to add said transformed differences to said transformed converted data forming corrected transformed data.

52. A system as recited in claim 51, wherein a first transform type used in the forward transformer to forward transform said initial converted data is different from a second transform type used in the inverse transformer.

53. A system as recited in claim 51, further comprising an inverse quantizer for perform an inverse quantization of transform-coded data to form the transform data.

54. A system as recited in claim 53, further comprising a quantizer to perform a quantization of said corrected transformed data forming quantized data.

55. A system as recited in claim 54, wherein said inverse quantizer and said quantizer use at least one different quantization value.

56. A system for digitally processing transform data representing a phenomenon, the system comprising:

an inverse transformer to perform an inverse transform of said transform data to the real domain using high-precision numbers;

a converter to convert said high-precision numbers to integers and a clipper to clip the integers to an allowed range forming initial converted data;

a subtractor to subtract said initial converted data from said high-precision numbers forming high-precision differences;

a manipulator to manipulate said initial converted data to produce an effect and forming processed converted data;

a forward transformer to forward transform said processed converted data forming transformed converted data;

a forward transformer to forward transform said high-precision differences forming transformed differences; and an adder to add said transformed differences to said transformed converted data forming corrected transformed data.

57. A system as recited in claim 56, further comprising an inverse quantizer to perform an inverse quantization of transform-coded data to form the transform data.

58. A system as recited in claim 57, further comprising a quantizer to perform a quantization of said corrected transformed data forming quantized data.

59. A system as recited in claim 58, further comprising an entropy decoder for decoding coded data forming the transform-coded data.

60. A system as recited in claim 59, further comprising an entropy encoder for encoding the quantized data forming encoded data.

61. A system for digitally processing transform data representing a phenomenon, the system comprising:

an inverse transformer to perform an inverse transform of said transform data to the real domain using high-precision numbers;

a converter to convert said high-precision numbers to integers and a clipper to clip the integers to an allowed range forming initial converted data;

a subtractor to subtract said initial converted data from said high-precision numbers forming high-precision differences;

a manipulator for manipulating said initial converted data to produce a first effect forming processed converted data;

a forward transformer to forward transform said processed converted data forming transformed converted data;

a manipulator for manipulating said high-precision differences to produce a second effect and forming processed high-precision differences;

a forward transformer to forward transform said processed high-precision differences forming transformed differences; and an adder to add said transformed differences to said transformed converted data forming corrected transformed data.

62. A system as recited in claim 61, further comprising an inverse quantizer to perform an inverse quantization of transform-coded data to form the transform data.

63. A system as recited in claim 62, further comprising a quantizer to perform a quantization of said corrected transformed data forming quantized data.

64. A system for digitally processing transform data representing a phenomenon, the system comprising:

an inverse transformer to perform an inverse transform of said transform data to the real domain using high-precision numbers;

a converter to convert said high-precision numbers to integers and a clipper to clip the integers to an allowed range forming initial converted data;

a subtractor to subtract said initial converted data from said high-precision numbers forming high-precision differences;

a first forward transformer to forward transform said high-precision differences forming transformed differences;

a first manipulator for manipulating said initial converted data to produce a first effect forming processed converted data;

a second forward transformer to forward transform said processed converted data forming transformed converted data;

a second manipulator for manipulating said transformed differences to produce a second effect forming processed transformed differences; and an adder to add said processed transformed differences to said transformed converted data forming corrected transformed data.

65. A system as recited in claim 64, further comprising a first inverse quantizer to perform an inverse quantization of transform-coded data to form the transform data.

66. A system as recited in claim 65, further comprising a first quantizer to perform a quantization of said corrected transformed data forming quantized data.

67. A system as recited in claim 66, wherein the manipulator for manipulating said transformed differences further comprises:

a second quantizer for performing a quantization of said transformed differences forming quantized differences;

a second inverse quantizer for performing an inverse quantization of said quantized differences forming dequantized differences; and a third manipulator to manipulate said dequantized differences to produce a second effect forming processed transformed differences.

68. A system as recited in claim 67, further comprising an entropy encoder for encoding the quantized differences forming encoded differences.

69. A system as recited in claim 68, further comprising an entropy decoder for decoding the encoded differences reforming the quantized differences.

70. A system as recited in claim 67, wherein the second quantizer and the second inverse quantizer each use half an amount of quantization values as is used in the first quantizer.

71. A system as recited in claim 66, wherein the second manipulator includes:

a difference manipulator to manipulate said transformed differences to produce a second effect forming manipulated transformed differences;

a difference quantizer for performing a quantization of said manipulated transformed differences forming quantized differences; and a difference inverse quantizer for performing an inverse quantization of said quantized differences forming the processed transformed differences.

72. A system as recited in claim 71, further comprising an entropy encoder for encoding the quantized differences forming encoded differences.

73. A system as recited in claim 72, further comprising an entropy decoder for decoding the encoded differences reforming the quantized differences.

74. A system as recited in claim 71, wherein second manipulator includes an alternate manipulator to manipulate said dequantized differences to produce a third effect and forming the processed transformed differences.

75. An article of manufacture comprising a computer usable medium having computer readable program code means embodied therein for digitally processing transform data representing a phenomenon, the computer readable program code means in said article of manufacture comprising computer readable program code means for causing a computer to effect:

performing an inverse transform of said transform data to the real domain forming high-precision numbers;

converting said high-precision numbers to integers and clipping the integers to an allowed range forming initial converted data;

subtracting said initial converted data from said high-precision numbers forming high-precision differences;

forward transforming said initial converted data forming transformed converted data;

forward transforming said high-precision differences forming transformed differences; and adding said transformed differences to said transformed converted data forming corrected transformed data.

76. An article of manufacture as recited in claim 75, the computer readable program code means in said article of manufacture further comprising computer readable program code means for causing a computer to effect performing an inverse quantization of transform-coded data to form the transform data.

77. An article of manufacture as recited in claim 76, the computer readable program code means in said article of manufacture further comprising computer readable program code means for causing a computer to effect performing a quantization of said corrected transformed data forming quantized data.

78. An article of manufacture as recited in claim 77, the computer readable program code means in said article of manufacture further comprising computer readable program code means for causing a computer to effect:

entropy decoding the coded data forming the transform-coded data; and entropy encoding the quantized data forming encoded data.

79. A computer program product comprising a computer usable medium having computer readable program code means embodied therein for digitally processing transform data in the real domain representing a phenomenon, the computer readable program code means in said computer program product comprising computer readable program code means for causing a computer to effect:

performing an inverse transform of said transform data to the real domain forming high-precision numbers;

converting said high-precision numbers to integers and clipping the integers to an allowed range forming initial converted data;

subtracting said initial converted data from said high-precision numbers forming high-precision differences;

manipulating said initial converted data to produce an effect and forming processed converted data;

forward transforming said processed converted data forming transformed converted data;

forward transforming said high-precision differences forming transformed differences; and adding said transformed differences to said transformed converted data forming corrected transformed data.

80. A computer program product as recited in claim 79, the computer readable program code means in said computer program product further comprising performing an inverse quantization of transform-coded data forming the transform data.

81. A computer program product as recited in claim 80, the computer readable program code means in said computer program product further comprising performing a quantization of said corrected transformed data forming quantized data.

82. A program storage device readable by machine, tangibly embodying a program of instructions executable by the machine to perform method steps for digitally processing transform data representing a phenomenon, said method steps comprising:

performing an inverse transform of said transform data to the real domain forming initial high-precision numbers;

converting said initial high-precision numbers to integers and clipping the integers to an allowed range forming initial converted data;

subtracting said initial converted data from said initial high-precision numbers forming high-precision differences;

manipulating said initial converted data to produce a first effect forming processed converted data;

forward transforming said processed converted data forming transformed converted data;

manipulating said initial high-precision differences to produce a second effect and forming processed high-precision differences;

forward transforming said processed high-precision differences forming transformed differences; and adding said transformed differences to said transformed converted data forming corrected transformed data.

83. A program storage device readable by machine, tangibly embodying a program of instructions executable by the machine to perform method steps for digitally processing transform data representing a phenomenon, said method steps comprising:

performing an inverse transform of said transform data to the real domain forming high-precision numbers;

converting said high-precision numbers to integers and clipping the integers to an allowed range forming initial converted data;

subtracting said initial converted data from said high-precision numbers forming high-precision differences;

forward transforming said high-precision differences forming transformed differences;

manipulating said initial converted data to produce a first effect and forming processed converted data;

forward transforming said processed converted data forming transformed converted data;

manipulating said transformed differences to produce a second effect forming processed transformed differences; and adding said processed transformed differences to said transformed converted data forming corrected transformed data.

84. A program storage device readable by machine as recited in claim 83, said method steps further comprising performing an inverse quantization of transform-coded data forming the transform data.

85. A program storage device readable by machine as recited in claim 84, said method steps further comprising performing a quantization of said corrected transformed data forming quantized data.

86. A program storage device readable by machine as recited in claim 85, said method steps further comprising:

entropy decoding coded data forming the transform-coded data; and entropy encoding the quantized data forming encoded data.

87. A program storage device readable by machine as recited in claim 86, said method steps further comprising alternating said manipulating steps with said steps of performing a forward transform, performing a quantization, entropy encoding, entropy decoding, performing an inverse quantization, and performing an inverse transform a desired number of times.

88. A program storage device readable by machine as recited in claim 87, wherein said coded data are compressed data, and each step of alternating implements a compression/decompression cycle.

* * * * *